US00RE41517E

(19) United States
(12) Reissued Patent
Possley et al.

(10) Patent Number: US RE41,517 E
(45) Date of Reissued Patent: Aug. 17, 2010

(54) RECOVERY AND TRANSMISSION OF RETURN-TO-ZERO FORMATTED DATA USING NON-RETURN-TO-ZERO DEVICES

(76) Inventors: Nicholas Possley, 2451 Club Dr., Gilroy, CA (US) 95020; David B. Upham, 1660 Kamsack Dr., Sunnyvale, CA (US) 94087-5212

(21) Appl. No.: 11/231,280

(22) Filed: Sep. 20, 2005

Related U.S. Patent Documents

Reissue of:
(64) Patent No.: 6,624,766
Issued: Sep. 23, 2003
Appl. No.: 09/922,500
Filed: Aug. 2, 2001

U.S. Applications:
(60) Provisional application No. 60/289,940, filed on May 9, 2001.

(51) Int. Cl.
*H03M 7/40* (2006.01)

(52) U.S. Cl. ..... 341/69; 341/56
(58) Field of Classification Search ..... 341/69, 341/68, 65, 67, 59, 58, 100, 101, 55; 375/240.01, 375/293; 714/709; 713/501; 326/106
See application file for complete search history.

(56) References Cited

U.S. PATENT DOCUMENTS 4,264,973 A * 4/1981 Hustig ..... 375/293
4,520,346 A * 5/1985 Shimada ..... 341/58
4,910,586 A * 3/1990 Sharpe ..... 375/240.01
5,056,118 A * 10/1991 Sun ..... 375/342
5,075,792 A 12/1991 Brown et al.
5,349,349 A * 9/1994 Shimizume ..... 341/58
5,349,588 A * 9/1994 Schellinger ..... 714/778
5,590,316 A * 12/1996 Hausauer ..... 713/501
5,614,901 A * 3/1997 Haas ..... 341/68
5,714,904 A * 2/1998 Jeong ..... 327/407
5,757,297 A * 5/1998 Ferraiolo et al. ..... 341/100
5,805,632 A * 9/1998 Leger ..... 375/282
5,946,355 A * 8/1999 Baker ..... 375/286
6,246,348 B1 6/2001 Moscatelli
6,248,348 B1 * 6/2001 Landrau et al. ..... 424/448
6,346,895 B1 * 2/2002 Lee et al. ..... 341/58

* cited by examiner

*Primary Examiner*—Jean Bruner Jeanglaude

(57) ABSTRACT

Return-to-zero (RZ) formatted data is recovered and transmitted using non-return-to-zero (NRZ) devices. A NRZ clock and data recovery device (CDR) interprets the clock rate of a RZ formatted signal as twice its actual clock rate. Due to this interpretation, extra zeroes will be inserted in the data stream. The extra zeroes introduced by the NRZ interpretation of the data are discarded, and the interpreted clock rate is divided resulting in preserving the values of the original data stream of the RZ formatted signal.

A NRZ encoded data stream at a specific clock rate is processed so that when the data stream is transmitted to a recipient expecting RZ formatted data, the recipient interprets the correct data.

23 Claims, 23 Drawing Sheets

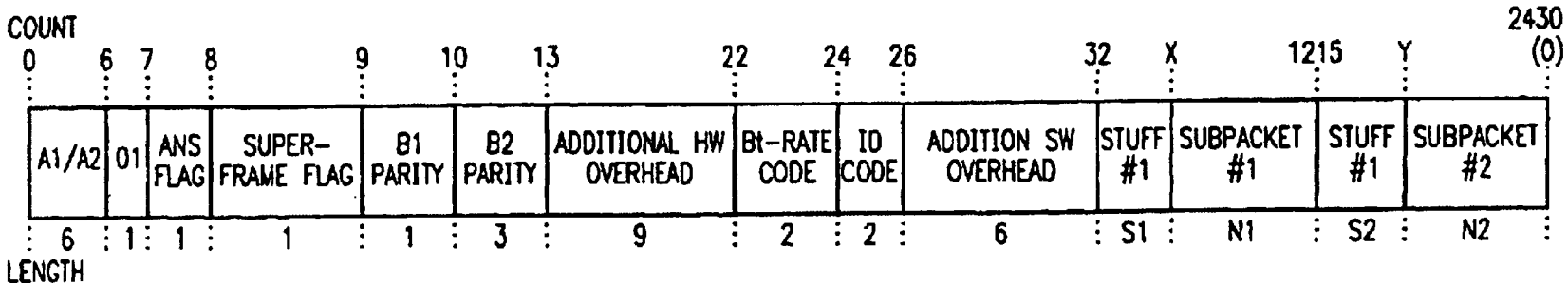

A1/A2 bytes–SONETheader for STS3.

Additional SW Overhead–6bytes

Additional HW Overhead–9bytes

Subpacket–target bytes carried in frame. Two subpackets to reduce system latency.

Stuff–stuff bytes to fill unused parts of packet.

Parity–1 byte parity for performance monitoring

N1–subpacket 1 byte count
N2–subpacket 2 byte count
N1+N2=N(target signal bytes per frame)
S1–Stuff #1 byte count
S2–Stuff #2 byte count
X–Stuff #1 end count Memory mapped register
Y–Stuff #2 end count Memory Mapped register
T–Target Signal Data Rate N=T/(8kHz)*(1/8)*(1/4) bytes/frame S1+S2=2430–N–32 bytes/frame

FIG. 9

DATA INPUT
CLOCK INPUT (UP TO 77.76 MHz)
FRAME PULSE INPUT
BYTE-INTERLEAVED DEMUX DATA "A" OUTPUT 1514A
BYTE-INTERLEAVED DEMUX DATA "B" OUTPUT 1514B
BYTE-INTERLEAVED DEMUX DATA "C" OUTPUT 1514C
BYTE-INTERLEAVED DEMUX DATA "D" OUTPUT 1514D
CLOCK OUTPUT (UP TO 19.44 MHz)
A1 (9)
A1 (10)
A1 (11)
A1 (12)
A2 (1)
A2 (2)
A2 (3)
A2 (4)
A2 (5)
A2 (6)
A1 (5)
A1 (6)
A1 (7)
A1 (8)
1010
1012
1014
1016
1018
1020
1022
1024

RECOVERY AND TRANSMISSION OF RETURN-TO-ZERO FORMATTED DATA USING NON-RETURN-TO-ZERO DEVICES

Matter enclosed in heavy brackets [ ] appears in the original patent but forms no part of this reissue specification; matter printed in italics indicates the additions made by reissue.

CROSS-REFERENCE TO RELATED APPLICATION

This application claims priority under 35 U.S.C. 119(e) from U.S. provisional patent application No. 60/289,940 having a filing date of May 9, 2001 which is entitled "System and Method for Recovering RZ Formatted Data Using NRZ Clock and Data Recovery," inventors Nicholas J. Possley and David B. Upham, and which is hereby incorporated by reference.

BACKGROUND OF THE INVENTION

1. Field of the Invention

This invention relates generally to a system and method for recovering and transmitting return-to-zero formatted data using a non-return-to-zero clock and data recovery unit and non-return-to-zero transmission module, respectively.

2. Description of the Related Art

As the result of continuous advances in technology, particularly in the area of networking, there is an increasing demand for communications bandwidth. For example, the growth of the Internet, home office usage, e-commerce and other broadband services are creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3, OC-3, or equivalent connections in the near future. As a result, the networking infrastructure will be required to accommodate greatly increased traffic.

Optical fiber is a transmission medium that is well suited to meet this increasing demand. Optical fiber has an inherent bandwidth that is much greater than metal-based conductors, such as twisted pair or coaxial cable. There is a significant installed base of optical fibers, and protocols such as SONET have been developed for the transmission of data over optical fibers. Typical communications system based on optical fibers include a transmitter, an optical fiber, and a receiver. The transmitter converts the data to be communicated into an optical form and transmits the resulting optical signal across the optical fiber to the receiver. The receiver recovers the original data from the received optical signal. Recent advances in transmitter and receiver technology have also resulted in improvements, such as increased bandwidth utilization, lower cost systems, and more reliable service.

Because of its large inherent bandwidth, an optical fiber is most efficiently used when multiple users share the fiber. Typically, a number of low-speed data streams (i.e., "low-speed channels"), for example transmitted by different users, are combined into a single high-speed channel for transport across the fiber. Conversely, when the high-speed channel reaches the destination for one of the low-speed channels contained within it, the low-speed channel is extracted from the rest of the high-speed channel. For certain applications, it may also be desirable or even required that the original timing of the low-speed channel be maintained when the low-speed channel is extracted from the corresponding high-speed channel. These lower speed channels may have variable rates.

It is desirable to have input and output converters that can handle inputs with variable or non-uniform rates as well as outputs at variable or non-uniform rates so that they can travel in the optical fiber communications system. For example, an add/drop multiplexer may have a data path granularity at an STS-3 rate, a standard or uniform rate for a SONET transmission system. However, signals having data rates developed for proprietary or other non-standardized systems may be desired to be added to and dropped from the optical fiber communication system.

In addition, it is desirable to have a system that can process signals with a Return-to-Zero (RZ) signal format as well as a Non-Return-to-Zero (NRZ) format. Presently, most high-speed communications systems use a Non-Return-to-Zero (NRZ) format. RZ (Return-to-Zero) clock and data recovery circuits are not widely available for high data rates, however; NRZ circuitry, for example, a NRZ clock and data recovery (CDR) unit, which may be embodied as a chip, is widely available. Recovery and transmission of RZ formatted data using NRZ devices is highly desirable.

Alternately, there may be requirements on the maximum amount of timing jitter introduced and/or propagated by the overall transmission process. Tight jitter tolerances are beneficial since excessive timing jitter can significantly degrade the performance of the network. For example, if each data bit is expected during a certain timeslot, then the timeslot must be large enough to accommodate any jitter introduced by transmission over the network. Loose jitter tolerances will result in longer timeslots required for each bit that, in turn, will mean lower data transmission rates.

Whether and with what difficulty these timing requirements can be achieved will depend in part on the specific technique used to combine the low-speed channels. Two widely used approaches to combining low-speed channels are wavelength division multiplexing (WDM) and time division multiplexing (TDM).

In WDM or its more recent counterpart dense wavelength division multiplexing (DWDM), each low-speed channel is placed on an optical carrier of a different wavelength and the different wavelength carriers are combined to form the high-speed channel. Crosstalk between the low-speed channels is a major concern in WDM and, as a result, the wavelengths for the optical carriers must be spaced far enough apart (typically 50 GHz or more) so that the different low-speed channels are resolvable. As a result, the number of different optical carriers is limited and if each carrier corresponds to a low-speed channel, as is typically the case, the total number of low-speed channels is also limited. Furthermore, if the bandwidth capacity of the fiber is to be used efficiently, each low-speed channel must have a relatively high data rate due to the low number of low-speed channels. The relative complexity of the components used in WDM systems further encourages the use of high data rates for each dedicated wavelength, and hence also for each low-speed channel. For example, some current WDM systems specify data rates of 2.5 Gbps and higher for each dedicated wavelength. This typically is a drawback since, for example, many data streams occur at a much lower bit rate, such as at 155 Megabits per second (Mbps) for OC-3, and will underutilize the higher data rate specified for each dedicated wavelength.

In TDM, each low-speed channel is compressed into a certain time slot and the time slots are then combined on a time basis to form the high-speed channel. For example, in a certain period of time, the high-speed channel may be capable of transmitting 10 bits while each low-speed channel may only be capable of transmitting 1 bit. In this case, the first bit of the high-speed channel may be allocated to low-speed channel 1, the second bit to low-speed channel 2, and so on, thus forming a high-speed channel containing 10 low-speed channels. The TDM approach is strongly time-based and requires precise synchronization of the low-speed channels between nodes in a network. As a result, TDM systems typically require complex timing, leading to increased overall cost. In addition, since the low-speed channels typically are combined on a bit-by-bit (or byte-by-byte) basis, TDM systems are heavily dependent on the bit rates of the individual low-speed channels and have difficulty handling low-speed channels of different bit rates or different protocols. As yet another disadvantage, a TDM channel typically consists of a header in addition to the actual data to be transmitted. For example, SONET TDM protocols are based on standardized or uniform transmission rates. When ten low-speed channels are combined into a single high-speed channel at a 10× higher data rate using SONET TDM, protocols, the headers for the ten low-speed channels and the resulting high-speed channel typically must be manipulated in order to accomplish the conversion and also to undo the conversion (e.g., SONET pointer processing). This manipulation of the headers is not always straightforward and, in some cases, can even prevent the combination of certain types of channels.

Thus, there is a need for an inexpensive device which efficiently combines a number of low-speed channels into a high-speed channel and which can efficiently maintain the original timing of the low-speed channels and also meet timing jitter requirements for each channel, even when the low-speed channels are incorporated as part of a high-speed channel. Furthermore, there is a need for a device that is able to combine a number of low-speed channels having different rates into a high-speed channel, and vice versa. In addition, there is a need for a device to convert a variable rate or non-uniform signal to a uniform rate signal and a device which can recover the non-uniform signal from the uniform rate signal. The node preferably operates independent of bit rate, format, and protocol of the various channels and is capable of handling a large number of low data rate low-speed channels.

Finally, there is a need for recovery and transmission of RZ formatted data using NRZ devices.

Additionally, it is highly desirable for an inexpensive device to be able to perform one or more of the above-described activities.

SUMMARY

It is desirable to have a system and method for recovering the data of a RZ formatted signal using NRZ devices. An example of an NRZ device is a NRZ clock and data recovery unit (NRZ CDR).

It is also desirable to have a system and method for transmitting a signal using NRZ devices to a receiver of a recipient. From the transmitted signal, the recipient, which is expecting RZ formatted data, will be able to recover the correct data stream and data rate.

FIG. 19A illustrates an example of a signal encoding a bit sequence, 10101 in this example, according to the RZ format and of a signal encoding the same bit sequence according to an NRZ format. The signals have the same clock rate. RZ is a coding technique for binary data that encodes a logic '1' as a pulse having a width of about half a clock period of the data. A logic '0' results in no pulse. In contrast, NRZ is a coding technique for binary data that encodes a logic '1' as a "high" voltage level for the entire clock period and a logic '0' as a "low" voltage level for the clock period. The voltage level will change at each clock period of the data when the data changes. The "high" and "low" voltage levels are defined according to the type of logic used, for example positive or negative logic.

FIG. 19B illustrates the resulting interpretation of the bit sequence, 10101, formatted as a RZ signal, when the sequence is recovered by a NRZ clock and data recovery unit (NRZ CDR). The NRZ CDR recovers a clock and data under the assumption that the data is encoded in NRZ format. As a result, the pulse period for the incoming RZ formatted signal (which is about half the clock period of the RZ formatted signal) is interpreted by the NRZ CDR as the full clock period for the signal. In effect, the NRZ CDR recovers a clock at twice the clock rate of the RZ signal. This results in the data bits 10101 being recovered by the NRZ CDR as data bits 1000100010.

One aspect of the invention takes advantage of the fact that a NRZ CDR interprets the clock rate of a signal with RZ formatted data as twice its actual clock rate and compensates by discarding the extra zeroes introduced by the NRZ interpretation of the data. The data rate of the RZ formatted signal is maintained by frequency dividing the interpreted clock rate. For example, the interpreted or intermediate clock signal may be effectively divided by two. The original data values and data rate of the RZ formatted signal are recovered.

In another aspect of the invention, NRZ formatted data at a specified clock rate is to be transmitted to a recipient expecting RZ formatted data, for example a tributary. A zero is inserted after every bit of the data stream to generate an intermediate data stream. The clock rate is doubled. The intermediate data stream is encoded as a NRZ data stream using the doubled clock rate. The recipient, which is expecting RZ formatted data, will then recover the correct data stream and data rate.

One advantage of the present invention is that NRZ devices, which are widely available for high data rates, may be used for recovery and transmission of RZ formatted data.

BRIEF DESCRIPTION OF THE DRAWING

The invention has other advantages and features which will be more readily apparent from the following detailed description of the invention and the appended claims, when taken in conjunction with the accompanying drawings, in which:

FIG. 9 is a graphical representation of an embodiment of a data transmission frame format for a signal comprising a uniform STS-3 rate comprising the data of a non-uniform rate signal.

DETAILED DESCRIPTION

Figure 1A:
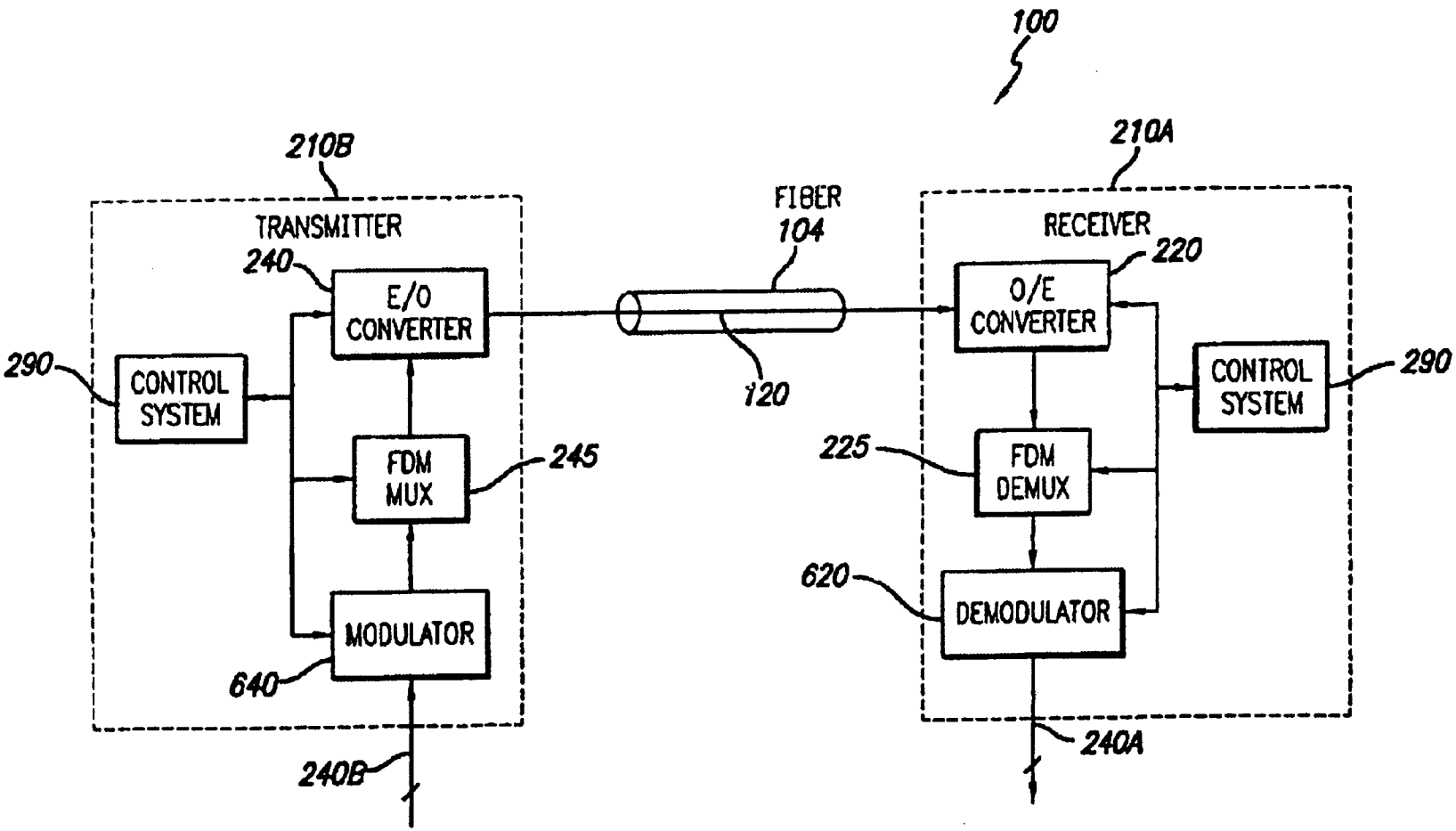
FIG. 1A is a block diagram of a fiber optic communications system 100 in accordance with the present invention.

FIG. 1A is a block diagram of a fiber optic communications system 100 in accordance with the present invention. System 100 includes a transmitter 210B coupled to a receiver 210A by an optical fiber 104. Transmitter 210B and receiver 210A are both based on frequency division multiplexing (FDM). Transmitter 210B includes a modulator 640, FDM multiplexer 245 and E/O converter 240, coupled in series. The modulator 640 applies a modulation to a plurality of incoming signals 240B. The FDM multiplexer 245 combines the modulated signals into a single signal using FDM techniques. E/O converter 240 converts this single signal from electrical to optical form 120. The E/O converter 240 preferably includes an optical source, such as a laser, and an optical modulator, such as a Mach Zender modulator, which modulates the optical carrier produced by the optical source with an incoming electrical signal.

For convenience, the incoming signals 240B shall be referred to as low-speed data channels; the modulated signals produced by modulator 640 as low-speed symbol channels, the single signal formed by FDM multiplexer 245 as an electrical high-speed channel, and the final optical output 120 as an optical high-speed channel. As used in this description, a data channel is a stream of data whereas a symbol channel is a stream of symbols. "Data" typically refers to individual bits so, for example, a bit stream would be an example of a data channel. In contrast, "symbol" typically refers to a representation suitable for transmission over an analog transmission medium. Each symbol may represent one or more than one bit, depending on the modulation technique used.

Receiver 210A reverses the function performed by transmitter 210B, reconstructing the original data channels 240B at the receiver location. More specifically, receiver 210A includes an O/E converter 220, an FDM demultiplexer 225, and a demodulator 620, coupled in series. The O/E converter 220, preferably a detector such as a high-speed PIN diode, converts the incoming optical high-speed channel 120 from optical to electrical form. The demultiplexer 225 frequency division demultiplexes the electrical high-speed channel into a plurality of low-speed symbol channels, which are then demodulated by demodulator 620 to recover the original low-speed data channels 240A.

The various components in transmitter 210B and receiver 210A are controlled by their respective control systems 290. The control systems 290 preferably also have an external port to allow external control of the transmitter 210B and receiver 210A. For example, an external network management system may manage a large fiber network, including a number of transmitters 210B and receivers 210A. Alternately, a technician may connect a craft terminal to the external port to allow local control of transmitter 210B or receiver 210A, as may be desirable during troubleshooting.

Figure 1B:
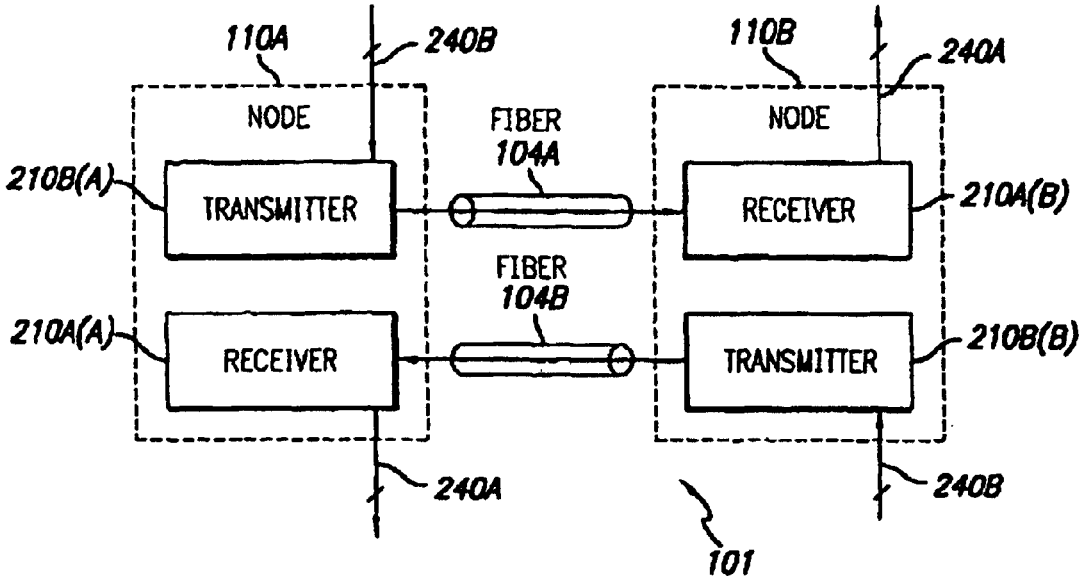
FIG. 1B is a block diagram of another fiber optic communications system 101 in accordance with the present invention.

Various aspects of the invention will be illustrated using the example system 100. However, the invention is not limited to this particular system 100. For example, FIG. 1B is a block diagram of another fiber optic communications system 101 also in accordance with the present invention. System 101 includes two nodes 110A and 110B, each of which includes a transmitter 210B and receiver 210A. The two nodes 110 are coupled to each other by two fibers 104A and 104B, each of which carries traffic from one node 110 to the other 110. Fiber 104A carries traffic from transmitter 210B (A) to receiver 210A(B); whereas fiber 104B carries traffic from transmitter 210B(B) to receiver 210A(A). In an embodiment, the fibers 104 also carry control or other overhead signals between the nodes 110. In an alternate embodiment, the nodes 110 may be connected by a single fiber 104, which carries bi-directional traffic. In other embodiments, the nodes 110 may contain additional functionality, such as add-drop functionality, thus allowing the nodes 110 to form more complex network configurations.

Figure 2:
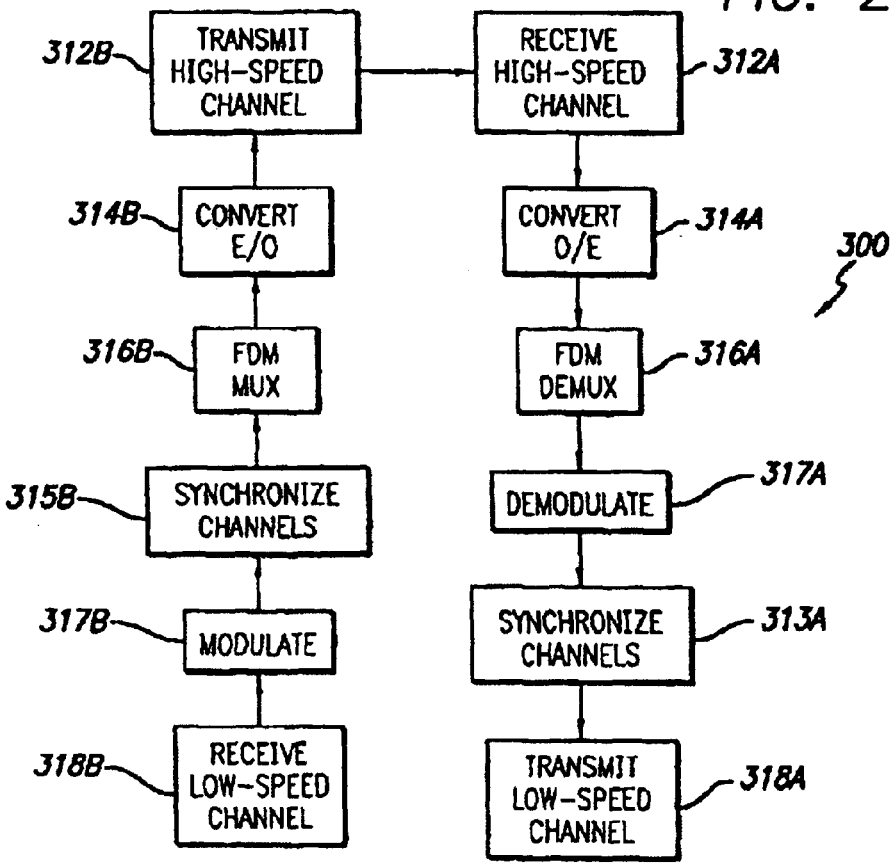
FIG. 2 is a flow diagram illustrating operation of system 100.

FIG. 2 is a flow diagram illustrating operation of system 100. At a high level, transmitter 210B combines low-speed channels 240B into an optical high-speed channel 120 using FDM techniques (steps 318B–312B). The optical high-speed channel 120 is transmitted across fiber 104 (steps 312). Receiver 210A then demultiplexes the received optical high-speed channel 120 into its constituent low-speed channels 240A (steps 312A–318A).

In more detail, low-speed data channels 240B are received 318B by transmitter 210B. Modulator 640 modulates 317B the low-speed data channels 240B to produce corresponding low-speed symbol channels. The low-speed symbol channels are synchronized 315B to the corresponding low-speed data channels, thus preserving the original timing of the low-speed data channels and preventing the excess accumulation of jitter. The FDM multiplexer 245 combines the symbol channels into a high-speed channel using frequency division multiplexing 316B techniques. Typically, each low-speed channel 240B is modulated on a carrier frequency distinct from all other carrier frequencies and these modulated carriers are then combined to form a single electrical high-speed channel, typically an RF signal. E/O converter 240 converts 314B the electrical high-speed channel to optical form, preferably via an optical modulator that modulates an optical carrier with the electrical high-speed channel. The optical high-speed channel 120 is transmitted 312B across fiber 104 to receiver 210A.

Figure 3A:
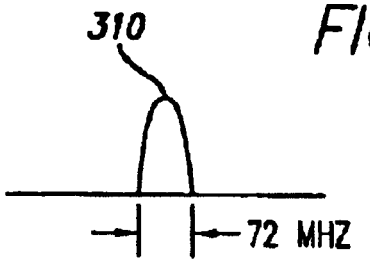
FIGS. 3A–3C are frequency diagrams illustrating operation of system 100.
Figure 3B:
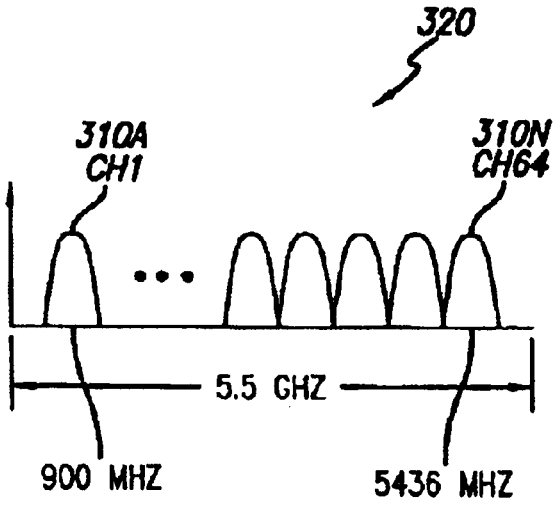
Figure 3C:
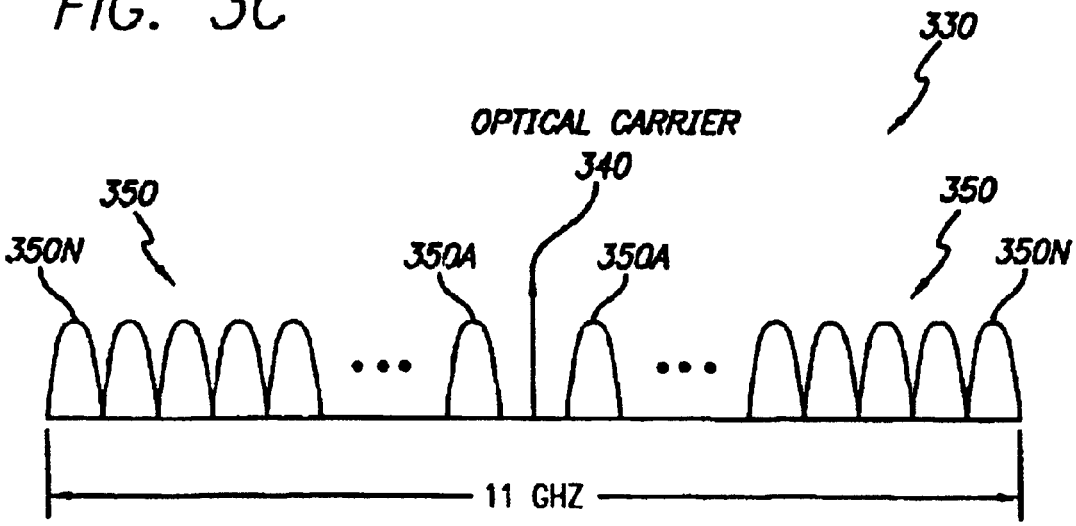

FIGS. 3A–3C are frequency diagrams illustrating the mapping of low-speed channels 240B to optical high-speed channel 120 in system 100. These diagrams are based on an example in which high-speed channel 120 carries 10 billion bits per second (Gbps), which is equivalent in data capacity to an OC-192 data stream. Each low-speed channel 240 is an electrical signal that has a data rate of 155 million bits per second (Mbps) and is similar to an STS-3 signal. This allows 64 low-speed channels 240 to be included in each high-speed channel 120. The invention, however, is not to be limited by this example.

FIG. 3A depicts the frequency spectrum 310 of one low-speed data channel 240B after modulation. In other words, spectrum 310 is the spectrum of the corresponding low-speed symbol channel. As mentioned previously, each low-speed data channel 240B has a data rate of 155 Mbps. In this example, the low-speed data channel 240B has been modulated and otherwise processed to produce a spectrally efficient waveform (i.e., a narrow spectrum), as will be described below. The resulting spectrum 310 has a width of approximately 72 MHz with low sidelobes. FIG. 3B is the frequency spectrum 320 of the electrical high-speed channel produced by FDM multiplexer 245. Each of the 64 low-speed channels 240B is allocated a different frequency band and then frequency-shifted to that band. The signals are combined, resulting in the 64-lobed waveform 320. FIG. 3C illustrates the spectra 330 of the optical high-speed channel 120. The RF waveform 320 of FIG. 3B is intensity modulated. The result is a double sideband signal with a central optical carrier 340. Each sideband 350 has the same width as the RF waveform 320, resulting in a total bandwidth of approximately 11 GHz.

Receiver 210A reverses the functionality of transmitter 210B. The optical high-speed channel 120 is received 312A by the high-speed receiver 210A. O/E converter 220 converts 314A the optical high-speed channel 120A to an electrical high-speed channel, typically an RF signal. This electrical high-speed channel includes a number of low-speed symbol channels that were combined by frequency division multiplexing. FDM demultiplexer 225 frequency division demultiplexes 316A the high-speed signal to recover the low-speed symbol channels. Demodulator 620 demodulates 317A the low-speed symbol channels, thus recovering the original low-speed data channels 240A. The data channels 240A are synchronized 313A to the corresponding symbol channels, again maintaining the original timing of the low-speed channel and preventing the excess accumulation of jitter. The recovered low-speed data channels are then transmitted 318A to other destinations. The frequency spectrum of signals as they propagate through receiver 210A generally is the reverse of that shown in FIG. 3.

In an embodiment, a frequency band located between the sidebands and the optical carrier 340 is allocated for control and/or administrative purposes (e.g., for downloading software updates). In system 101 of FIG. 1B, the control systems 290 for each node 110 may communicate with each other by using the control channels on the two fibers 104. For example, control signals generated at receiver 210A(B) may be communicated to transmitter 210B(A) via the control channel on fiber 104B, and vice versa. Since it is often desirable to establish initial communications between nodes 110 using the control channel before establishing the actual data links using sidebands 350, the control channel preferably has a lower data rate and is less susceptible to transmission impairments than the data carrying sidebands 350.

Note that the synchronization steps 315B and 313A preserve the original timing of the low-speed data channels 240B as they are transmitted across system 100. In particular, the timing of a low-speed data channel 240B is transferred to the corresponding low-speed symbol channel generated by transmitter 210B because the symbol channel is synchronized 315B to the data channel 240B. On the receive side, this timing is further transferred to the recovered low-speed data channel 240A because the recovered data channel is synchronized 313A to the symbol channel. In short, the recovered data channel 240A is synchronized 313A to the symbol channel, which in turn is synchronized to the incoming data channel 240B. Thus, the entire system 100 is effectively transparent with respect to timing issues since the timing of outgoing data channel 240A effectively has the same timing as that of incoming data channel 240B.

Furthermore, the synchronization steps 315B and 313A, which maintain the original timing of each low-speed channel, occur on a low-speed channel by low-speed channel basis, either before the low-speed channels 240 have been frequency division multiplexed 316B to form the high-speed channel 120 or after the high-speed channel 120 has been frequency division demultiplexed 316A to recover the constituent low-speed channels 240. This approach simplifies the synchronization steps 315B and 313A because the timing synchronization is performed on low-speed electrical signals rather than high-speed signals 120, which would be more difficult.

The channel-by-channel approach is feasible because the synchronized low-speed channels are combined using frequency division multiplexing, with each low-speed channel 240 allocated a different frequency band for transmission. For example, referring again to FIG. 3, the low frequency channel 310A may enter transmitter 210B at or near baseband. FDM multiplexer 245 upshifts this channel 310A to a frequency of approximately 900 MHz. E/O converter 240 then intensity modulates this channel, resulting in two sidelobes 350A that are 900 MHz displaced from the optical carrier 340. Low-speed channel 310A propagates across fiber 104 at these particular frequencies and is then downshifted accordingly by receiver 210A. In contrast, the high frequency channel 31 ON is upshifted by FDM multiplexer 245 to a frequency of approximately 5436 MHz and sidelobes 350N are correspondingly displaced with respect to optical carrier 340. The use of frequency division multiplexing to combine the low-speed channels does not significantly affect the timing of the constituent low-speed channels. Hence, they may be synchronized 315B before being combined, frequency division multiplexed 316B to allow for spectrally-efficient transmission 312 across fiber 104, and then demultiplexed 316A at receiver 210A, all without significantly affecting the original timing. In contrast, time-division multiplexing (TDM) often requires that low-speed channels be time-shifted to the correct timeslot in order to correctly combine them. Hence, synchronizing a low-speed channel before TDM multiplexing it with other low-speed channels is not particularly useful since the low-speed channel will have to be retimed as part of the TDM process, thus defeating the purpose of synchronization.

FIGS. 4–8 are more detailed block diagrams illustrating various portions of an embodiment of system 100. Each of these Figures includes a part A and a part B, which correspond to the receiver 210A and transmitter 210B, respectively. These figures will be explained by working along the transmitter 210B from the incoming low-speed channels 240B to the outgoing high-speed channel 120, first describing the component in the transmitter 120B (i.e., part B of each figure) and then describing the corresponding components in the 120A (i.e., part A of each figure). These figures are based on the same example as FIG. 3, namely 64 STS-3 data rate low-speed channels 240 are multiplexed into a single optical high-speed channel 120. However, the invention is not to be limited by this example or to the specific structures disclosed.

Figure 4A:
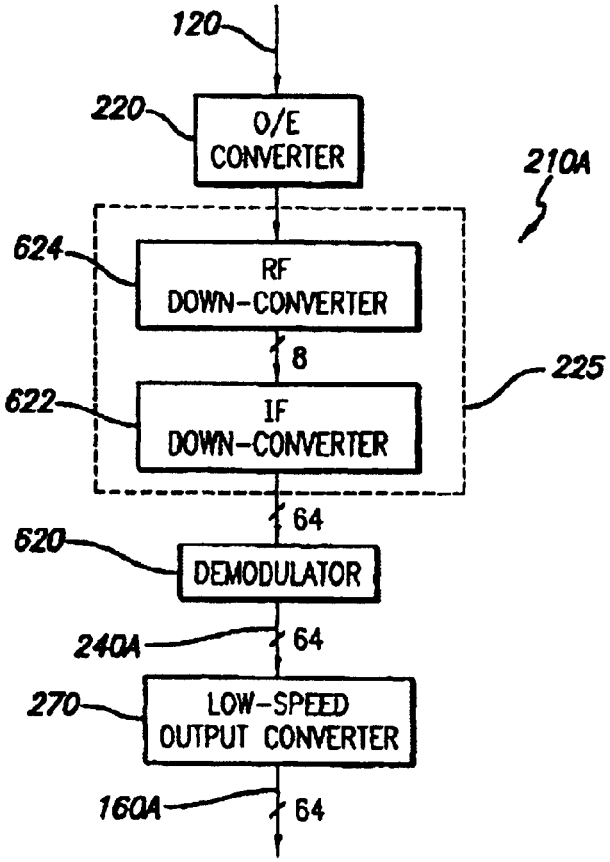
FIG. 4A is a block diagram of an embodiment of FDM demultiplexer 225.
Figure 4B:
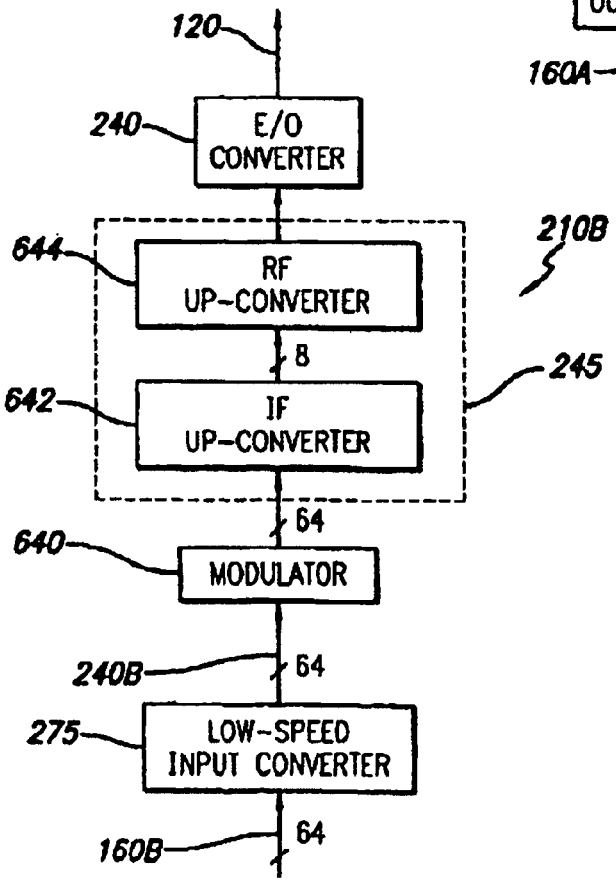
FIG. 4B is a block diagram of an embodiment of FDM multiplexer 245.

FIG. 4B is a block diagram of an embodiment of transmitter 210B. In addition to the components shown in FIG. 1A, this transmitter 210B also includes a low-speed input converter 275 coupled to the modulator 620. FDM multiplexer 245 includes two stages: an IF up-converter 642 and an RF up-converter 644 coupled in series. FIGS. 5B–8B show further details of each of these respective components. Similarly, FIG. 4A is a block diagram of an embodiment of receiver 210A. In addition to the components shown in FIG. 1A, this receiver 210A also includes a low-speed output converter 270 coupled to the FDM demultiplexer 225. FDM demultiplexer 225 includes an RF down-converter 624 and IF down-converter 622 coupled in series, with FIGS. 5A–8A showing the corresponding details.

Figure 5A:
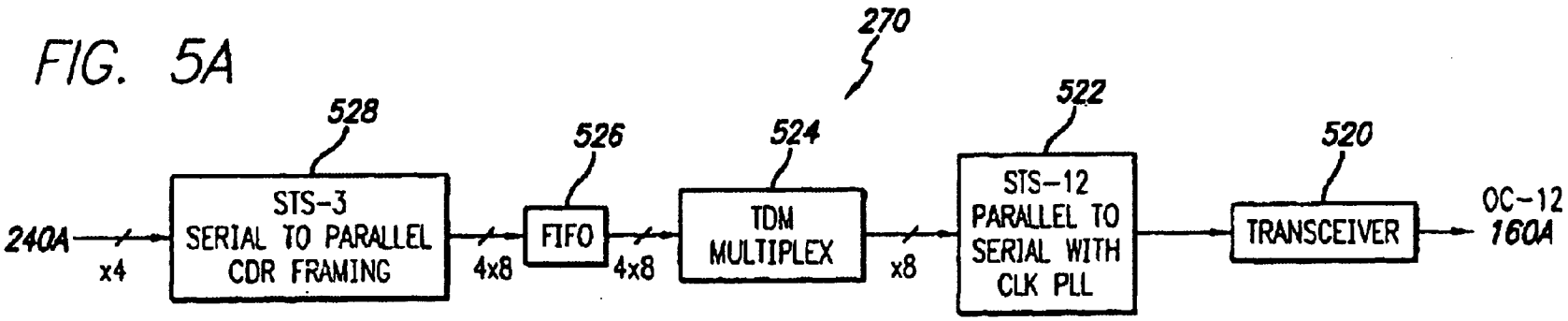
FIG. 5A is a block diagram of an embodiment of low-speed output converter 270.
Figure 5B:
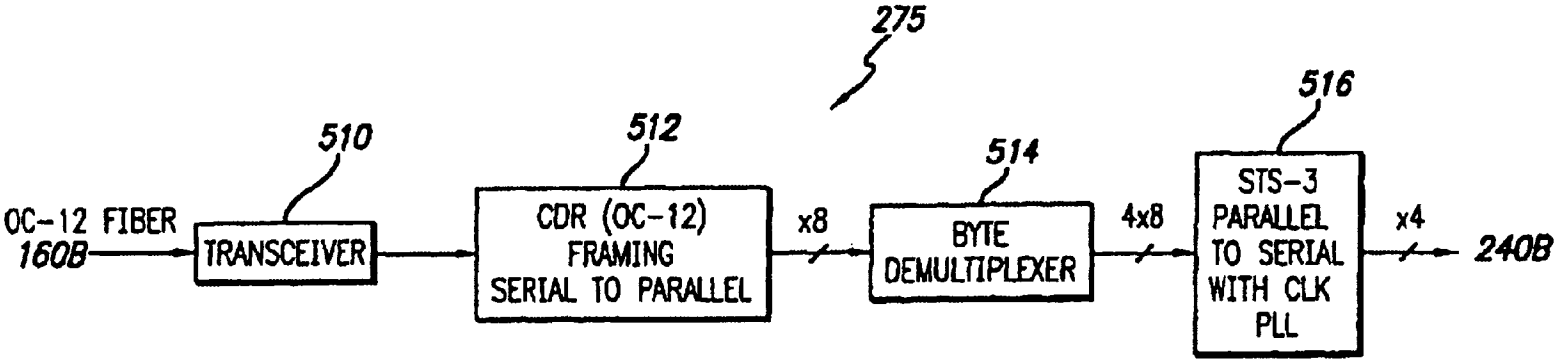
FIG. 5B is a block diagram of an embodiment of low-speed input converter 275.

FIGS. 5A–5B are block diagrams of one example of low-speed converter 270, 275, both of which maintain timing of the incoming signals. In the transmit direction, low-speed input converter 275 converts tributaries 160B to low-speed channels 240B, which have the same data rate as STS-3 signals in this embodiment. The structure of converter 275 depends on the format of the incoming tributary 160B. For example, if tributary 160B is an electrical signal then no conversion is required. If it is an optical signal, then converter 275 will perform an optical to electrical conversion.

In the example of FIG. 5B, converter 275 is designed to handle an OC-12 tributary. Other data rates can also be processed. Converter 275 includes an O/E converter 510, Clock and Data Recovery (CDR) Unit 512, TDM demultiplexer 514, and parallel to serial converter 516 coupled in series. The O/E converter 510 converts the incoming OC-12 tributary 160B from optical to electrical form, producing the corresponding STS-12 signal.

Figure 19A:
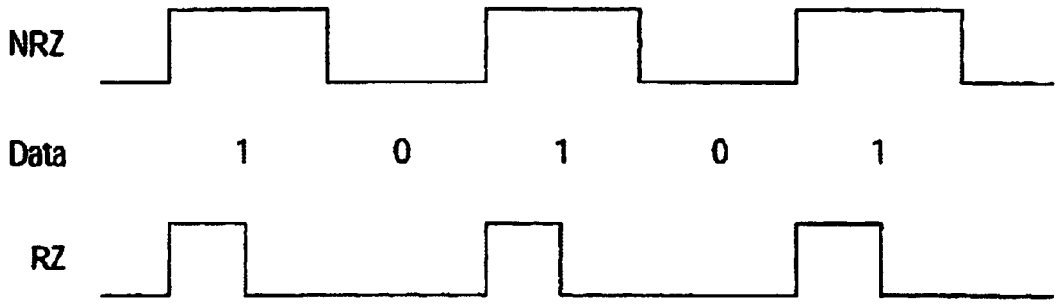
FIG. 19A illustrates an example of a bit sequence encoded according to the RZ format and according to the NRZ format.
Figure 19B:
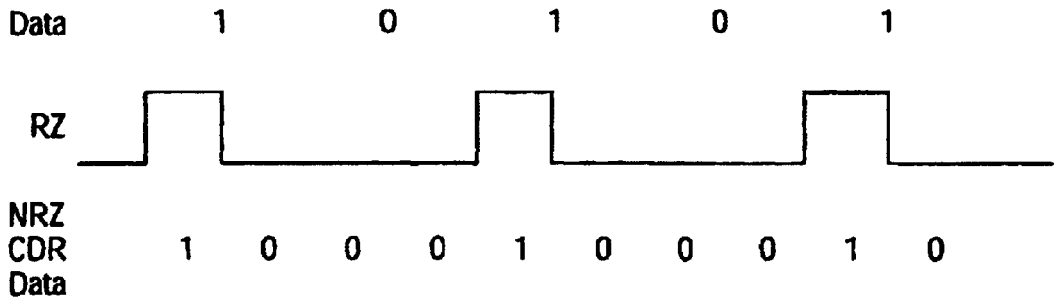
FIG. 19B illustrates the resulting interpretation of the bit sequence formatted as a RZ signal of the example in FIG. 19A when the sequence is recovered by a NRZ clock and data recovery unit (NRZ CDR).
Figure 19C:
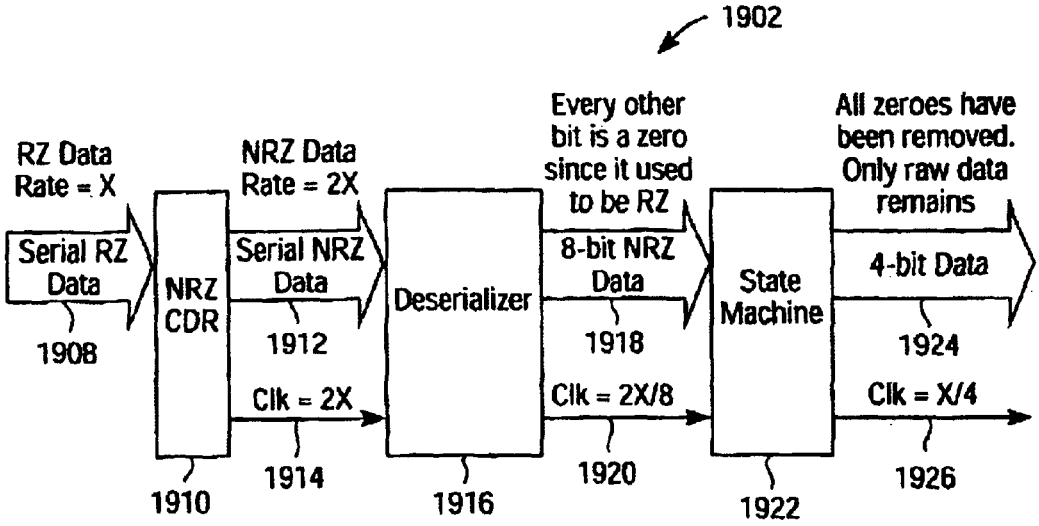
FIG. 19C illustrates an embodiment of a system for recovering the data of a RZ signal using a NRZ clock and data recovery unit (CDR) according to the present invention.

CDR 512 comprises in this embodiment a system 1902 for recovering RZ data using a NRZ CDR. FIG. 19C, illustrating an embodiment of a system 1902 for recovering the data of a Return-to-Zero (RZ) signal using a Non-Return-to-Zero (NRZ) clock and data recovery unit (CDR) according to the present invention, is discussed below.

In this example, CDR 512 performs clock and data recovery of the STS-12 signal and also determines framing for the signal. CDR 512 also converts the incoming bit stream into a byte stream. The output of CDR 512 is byte-wide, as indicated by the "x8." Demultiplexer 514 receives the signal from CDR 512 one byte at a time and byte demultiplexes the recovered STS-12 signal using time division demultiplexing (TDM) techniques. The result is four separate byte-wide signals, as indicated by the "4x8," each of which is equivalent in data rate to an STS-3 signal and with the corresponding framing. Converter 516 also converts each byte-wide signal into a serial signal at eight times the data rate, with the resulting output being four low-speed channels 240B, each at a data rate of 155 Mbps and phase-locked to the clock recovered by CDR 512 from the incoming OC-12 signal.

Low-speed input converter 270 of FIG. 5A implements the reverse functionality of converter 275, converting four 155 Mbps low-speed channels 240A into a single outgoing OC-12 tributary 160A. Other data rates can also be accommodated. In particular, converter 270 includes CDR 528, FIFO 526, TDM multiplexer 524, parallel to serial converter 522, and E/O converter 520 coupled in series. CDR 528 performs clock and data recovery of each of the four incoming low-speed channels 240A, determines framing for the channels, and converts the channels from serial to byte-wide parallel. The result is four byte-wide signals entering FIFO 526. FIFO 526 is a buffer that is used to synchronize the four signals in preparation for combining them into a single STS-12 signal. Multiplexer 524 performs the actual combination using TDM, on a byte level, to produce a single byte-wide signal equivalent in data capacity to an STS-12 signal. Parallel to serial converter 522 adds STS-12 framing to complete the STS-12 signal and converts the signal from byte-wide parallel to serial.

Figure 19D:
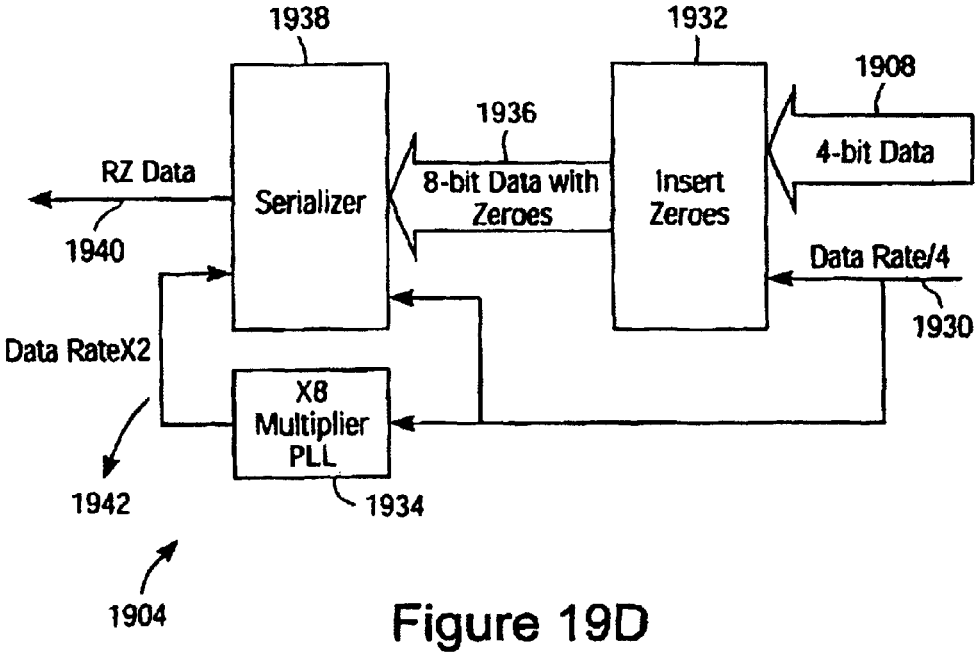
FIG. 19D illustrates an embodiment of a system for implementing another aspect of the invention in which the correct data values of NRZ formatted data are preserved when the data is sent to a recipient expecting RZ formatted data

In this embodiment, parallel to serial converter 522 comprises an embodiment of a system 1904 for preserving the correct data values of NRZ formatted data when the data is to be sent to a recipient expecting RZ formatted data, or in other words, for encoding a NRZ data stream clocked by a clock signal as a return-to-zero formatted signal. FIG. 19D, illustrating an embodiment of the system 1904, is discussed below.

E/O converter 520 converts the STS-12 signal to electrical form, producing the outgoing OC-12 tributary 160A that is phase-locked to the incoming clock recovered by CDR 528.

Converters 270 and 275 have been described in the context of OC-12 tributaries and low-speed channels with the same date rate as STS-3 signals, but the invention is not limited to these protocols. Alternate embodiments can vary the number, bit rate, format, and protocol of some or all of these tributaries 160 or of the low-speed channels 240. One advantage of the FDM approach illustrated in system 100 is that the system architecture is generally independent of these parameters. For example, the tributaries 160 can comprise four 2.5 Gbps (STS-48) data streams, 16 622 Mbps (STS-12) data streams, 64 155 Mbps (STS-3) data streams, 192 51.84 Mbps (STS-1) data streams, or any other bit rate or combinations of bit rates, without requiring major changes to the architecture of system 100. Similar flexibility exists for variable rate signals.

In the embodiment of FIGS. 5A and 5B, the tributary is a uniform rate for the SONET transmission system, STS-12 (OC-12), a multiple of the output uniform rate STS-3. However, data having a non-uniform transmission rate or variable rate with respect to a particular system may be desired to be transmitted and received in the communication system. One approach is to adjust the speed of the rest of system 100 (specifically the modulator 640 and demodulator 620 of FIG. 4) to match that of the tributary 160. However, in another embodiment, instead of adjusting the clocks in the system calibrated for uniform rate signals, the non-uniform rate signal is converted to a uniform rate signal. For example, if tributary 160B has a data rate of 300 Mbps, converter 275 may demultiplex the tributary into four 75 Mbps streams. Each stream is then stuffed with null data to give four 155 Mbps channels. Low-speed output converter 270 typically will reverse the functionality of low-speed input converter 275.

Figure 5C:
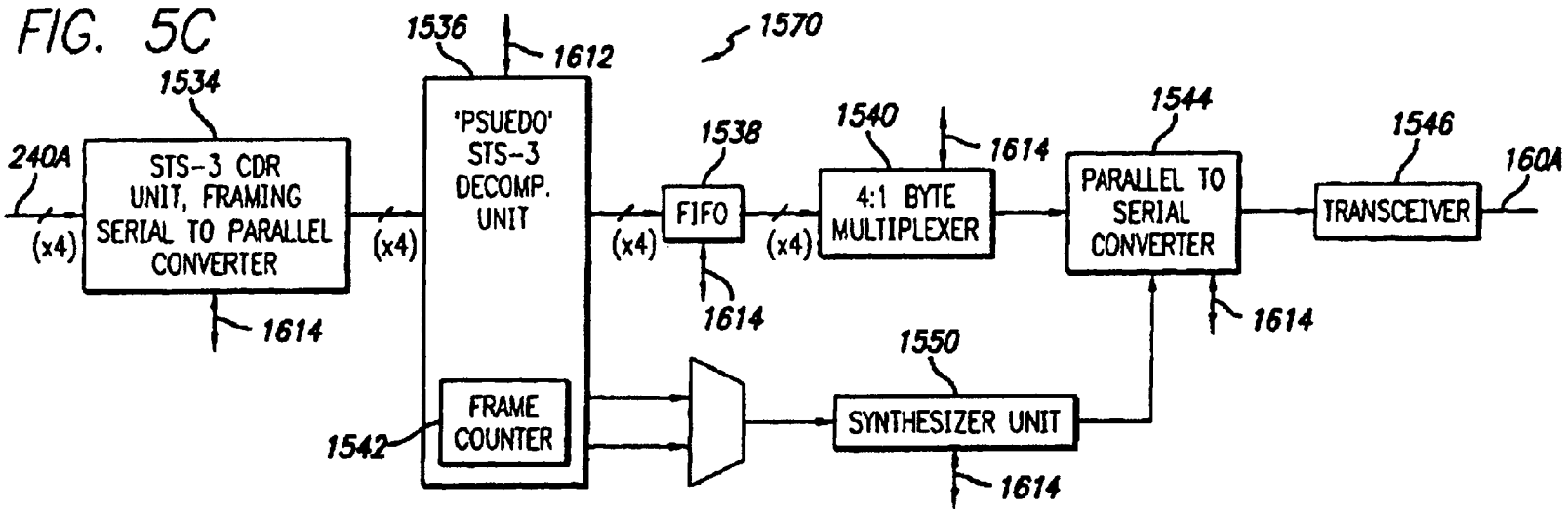
FIG. 5C is a block diagram of an embodiment of a variable rate output converter 1570.

FIG. 5C is a block diagram of another example of an output converter 1570, adapted to drop variable rate or non-uniform rate signals, also referred to as variable rate target signals. Examples of signals with non-uniform data rates comprise those comprising non-uniform bit rates that range from 44.736 to 605.696 Mbps. FIG. 5D is a block diagram of another example of an input converter 1575, adapted to add non-uniform rate signals.

Those skilled in the art will appreciate that although units or modules of the converters are depicted as individual units, any combination of the units of the input converter, output converter, or both may also be implemented in software, hardware, firmware, or any combination thereof.

The embodiment of the input converter 1575 in FIG. 5D preferably includes access to a control unit 1600, an O/E converter or transceiver 1510, a clock and data a recovery (CDR) unit 1512 including in this embodiment, a serial to parallel converter, a demultiplexer 1514, buffer 1515, in this embodiment a FIFO module having a plurality of FIFO buffers 1518, 1520, 1522, 1524, a parallel-to-serial converter 1516, a "pseudo" STS-3 generation module 1528, a frame counter 1530, and a synthesizer 1532.

Figure 15:
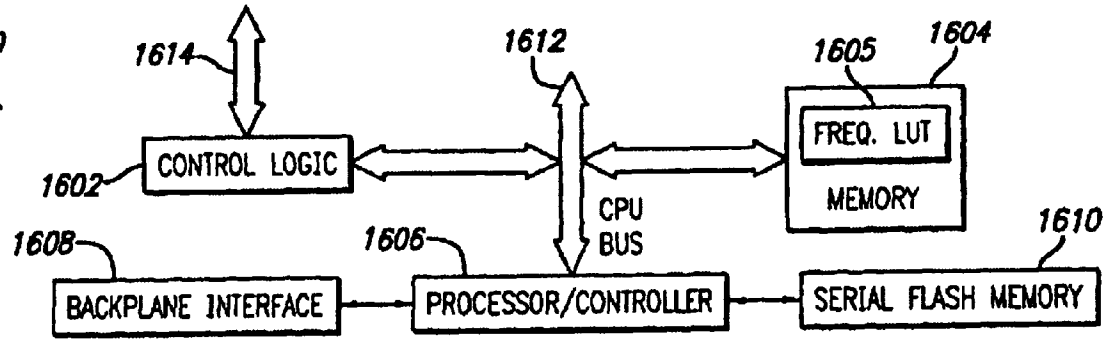
FIG. 15 is a block diagram of an embodiment of a control unit for the variable rate input and output converters of the present invention.

Referring now to FIG. 15, control unit 1600 for controlling the variable rate input and output converters 1570, 1575 is shown. The control unit 1600 preferably comprises control logic 1602, memory 1604, and a controller or processor 1606 coupled by a bus 1612 in a conventional manner. The control unit 1600 including the control logic 1602 is coupled by a communication unit 1614, comprising one or more communication channels, through which the control unit is communicatively coupled to the components of the variable rate input and output converters 1570, 1575. Additionally, the control unit 1600, including the controller or processor, is communicatively coupled through CPU bus 1612 to the components of the variable rate input and output converters 1570, 1575. The processor 1606 is also coupled to a back plane interface 1608 and serial flash memory 1610. The control unit 1600 operates to control the variable rate input and output converters 1570, 1575 as well as generate other alarm and control signals. Those skilled in the art will recognize that the control unit 1600 is programmed to operate and perform the processes described herein.

Transceiver 1510 is a variable rate transceiver capable of receiving a signal having a rate at one of various non-uniform rates. Transceiver 1510 accepts both asynchronous and synchronous input signals.

CDR 1512 comprises, in this embodiment, a system 1902 for recovering RZ data using a NRZ CDR. FIG. 19C, illustrating an embodiment of a system 1902 for recovering the data of a Return-to-Zero (RZ) signal using a Non-Return-to-Zero (NRZ) clock and data recovery unit (CDR) according to the present invention, is discussed below.

Furthermore, in this embodiment, the CDR unit 1512 recovers a first clock signal representing the non-uniform rate and the values of the data represented in the non-uniform signal.

In one embodiment, the CDR unit receives as input from the control unit a frequency range which includes the incoming or tributary non-uniform rate. In one embodiment, an optional approximate non-uniform bit rate clock is provided as a reference signal from an optional external synthesizer to assist the CDR unit in locking onto the target or non-uniform rate of the incoming signal. In other embodiments, the synthesizer unit providing an external reference of an approximate target bit rate may not be included as a matter of design choice.

Figure 5E:
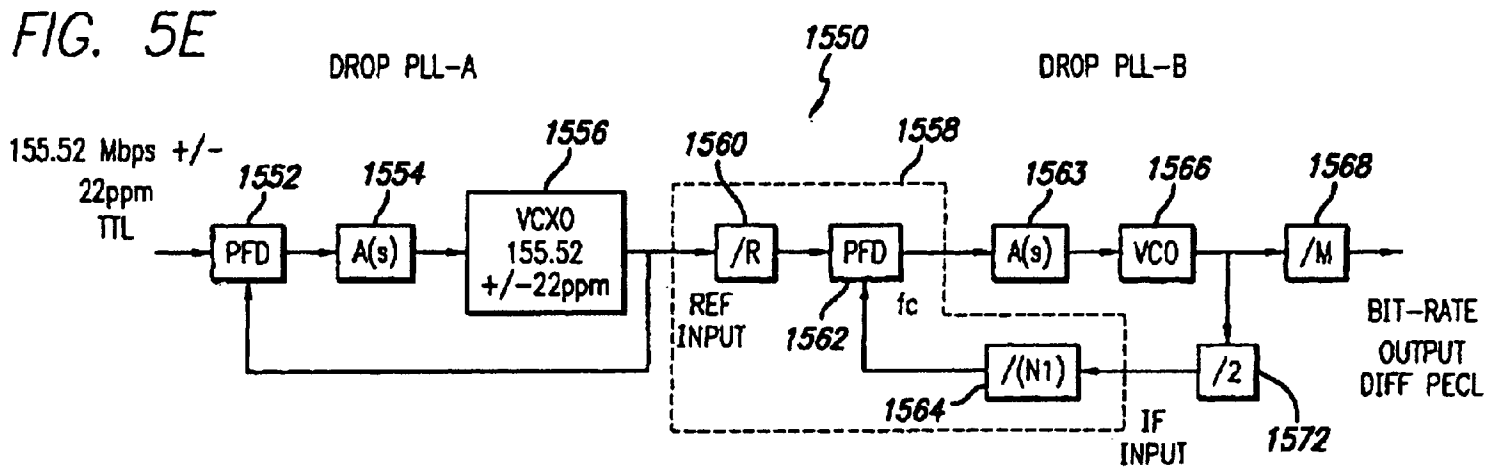
FIG. 5E is a block diagram of an embodiment of a phase locked loop (PLL) circuit embodied in synthesizer unit 1550.
Figure 5D:
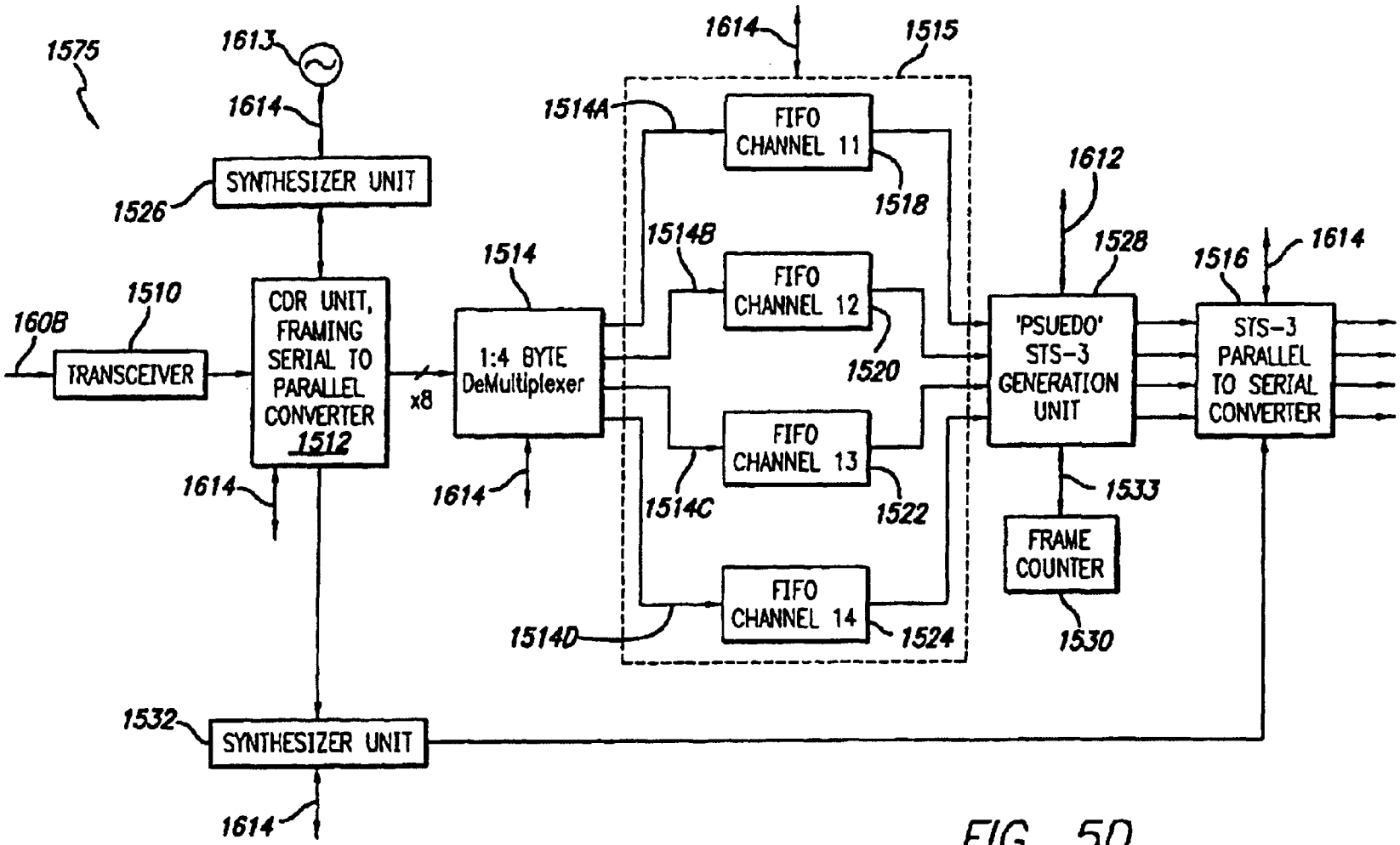
FIG. 5D is a block diagram of an embodiment of variable rate input converter 1575.
Figure 5F:
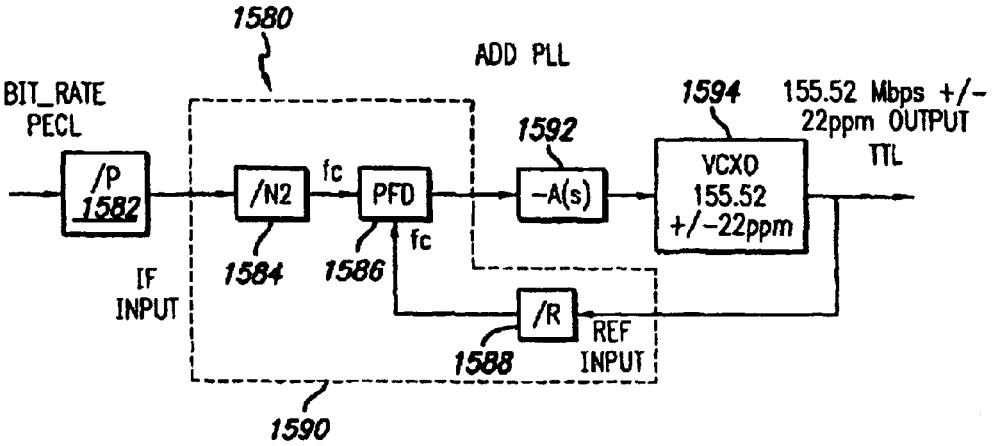
FIG. 5F is a block diagram of an embodiment of a phase locked loop (PLL) circuit embodied in synthesizer unit 1532.
Figure 5G:
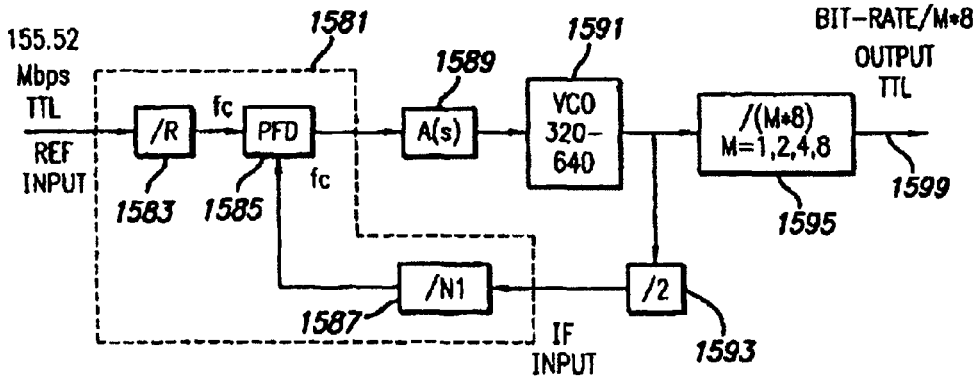
FIG. 5G is a block diagram of an embodiment of a phase locked loop (PLL) circuit embodied in synthesizer unit 1526.

FIG. 5G illustrates an embodiment of the optional synthesizer unit 1526 that may be used to provide an approximate target bit rate to the CDR unit. The synthesizer unit 1526 comprising an add reference phase lock loop 1581, a gain module 1589, a voltage controlled oscillator 1591 and frequency dividers 1593 and 1595.

In the embodiment shown in FIG. 5G, an on-board reference clock 1613 of 155.52 Mbps is input to the add reference phase lock loop circuit which generates the approximate target bit rate.

In another embodiment, a search mode is included in which the incoming non-uniform rate signal is unknown. In this embodiment, the control unit 1600 causes the CDR unit to attempt to lock on different target rates within a range of variable target rates until either signal lock occurs or each of the target rates in the look-up table of values has been implemented. In addition, the control logic causes the look-up table to be scanned from low frequencies to higher frequencies to avoid false locks in the rates.

Once the incoming or target rate clock is determined by the CDR unit, the target bit rate clock is forwarded to synthesizer unit 1532, which is controlled in a similar manner as the synthesizer 1526, and to the serial to parallel converter portion included in the CDR unit in this example. The serial to parallel converter will assemble the bits of the original target data into bytes and provide a target byte rate clock to the demultiplexer 1514 along with the bytes. The target bit rate is also forwarded to the control unit.

In the embodiment of FIG. 5D, the demultiplexer 1514 is a 1:4 byte-interleaved demultiplexer module. The demultiplexer may be embodied as a programmable logic device (PLD).

The demultiplexer 1514 receives the signal from the serial to parallel converter in unit 1512 one byte at a time and demultiplexes the recovered signal using time division demultiplexing (TDM) techniques. In this embodiment, the demultiplexer converts the input data stream into four sub-STS-3 rate byte-wide data streams. In this example, every fourth byte is routed in sequence to one of the four byte-wide output channels, each channel being associated with a first-in, first-out memory buffer in the buffer unit 1515. The demultiplexer 1514 also generates four clocks that track the four data streams. The clocks have frequencies that are one-fourth the recovered, variable-rate clock frequency in this example.

Figure 10:
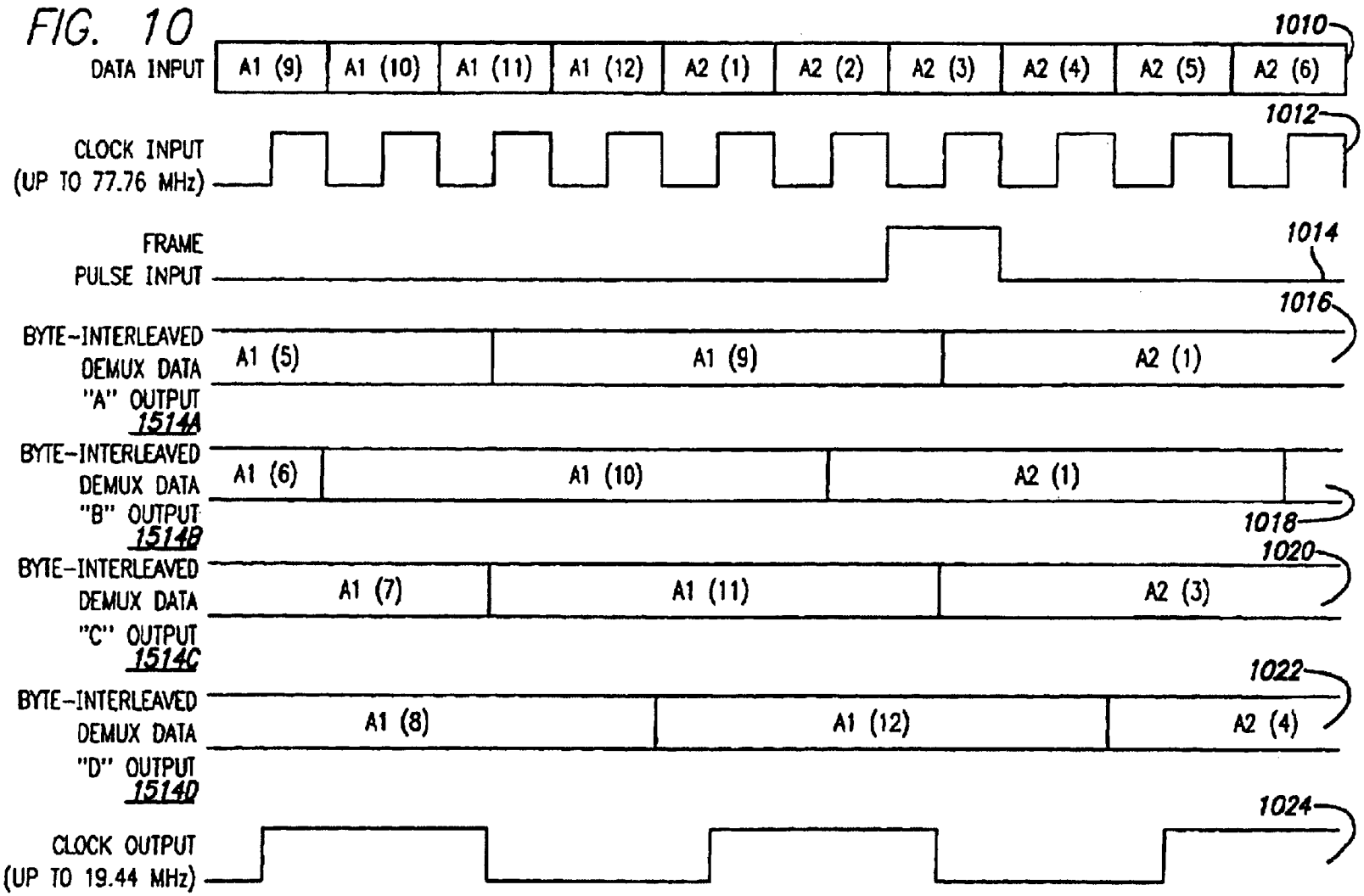
FIG. 10 illustrates one example of a timing diagram for demultiplexing as performed by a byte-interleaved demultiplexer

FIG. 10 illustrates one example of a timing diagram for a byte-interleaved demultiplexer that receives a variable rate clock input 1012, parallel data, and a start of frame signal corresponding to the first byte (A1) to be associated with a frame. The byte-interleaved demultiplexer then divides the input clock by four to get the appropriate sub-STS-3 rate byte interface output clocks, and routes every $4^{th}$ byte in sequence to one of the four sub-STS-3 rate byte-wide outputs. The following timing diagram illustrates the process.

The buffer unit 1515 preferably includes a plurality of FIFO buffers 1518, 1520, 1522 and 1524. Each of the FIFO buffers 1518, 1520, 1522 and 1524 is coupled to a respective output of the demultiplexer 1514 to receive a respective data stream. The data streams are clocked into the FIFO using the clock signals from the byte demultiplexer, which have frequencies that are one-fourth the frequency of the recovered, variable-rate clock. The data streams are clocked out of the FIFOs at the STS-3 rate per frame in this embodiment. The FIFO buffers 1518, 1520, 1522 and 1524 are used to compensate for the differences between the target clock of the original data and the STS-3-rate clocks. Because of the difference in clock frequencies between the read clock and write clock, in this embodiment, the FIFOs are filled with a predetermined number of bytes so as to make sure that they will never become empty during normal operation. The size of the FIFO is determined by the maximum number of bytes that needs to be pre-filled into the FIFO for all supported input bit rates. A latency for the add path equal to the time it takes to pre-fill the FIFO is built into the circuit. The FIFO control signals are provided by the generation unit 1528 (discussed below).

The following illustrates one example of a method for calculating the maximum latency through the memory buffers. If the FIFO is being read out at a clock rate of 19.44 MBytes per second and the minimum FIFO write clock rate when target signal rate is 44.736 Mbps is 4.86 Mbytes per second, then the number of bytes to be read out consecutively is as follows:

$$((44.736\ \text{Mbps}/32)*125\ \mu\text{sec})/2=303.75.$$

The time it takes to read out these bytes is: 303.75/19.44=15.625 μsec

The pre-fill byte count−15.625*(19.44−4.86)=227.8125.

The maximum latency=227.8125/(44.736 Mbps/32)=46.875 μsec

The maximum number of pre-fill bytes is calculated as follows.

46,875 μsec*(605.696 Mbps/32)=887.25

Thus the FIFO depth is chosen to be 1 Kbytes for this example.

Figure 14:
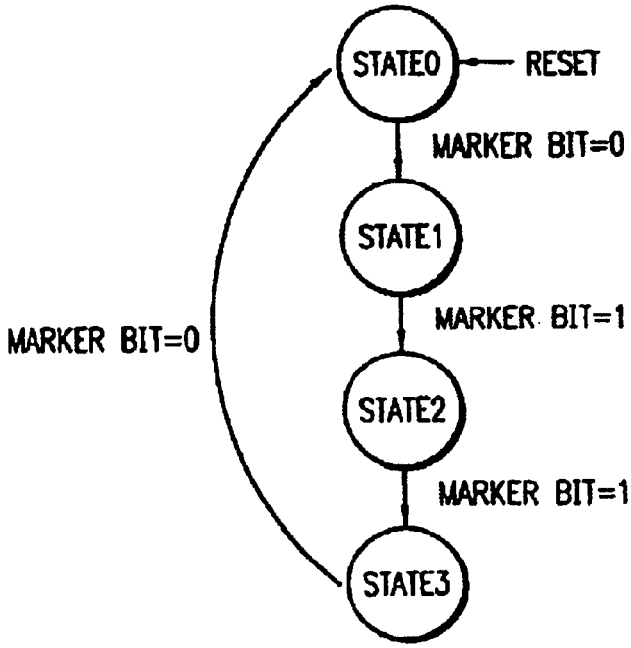
FIG. 14 is a state diagram for an embodiment of the operation of byte order realignment.

In an exemplary embodiment, the FIFO module consists of four independent 512x9 asynchronous FIFO buffers. To ensure that the bytes read out of the FIFO buffers 1518, 1520, 1522 and 1524 are in the proper order, each byte that is written into the FIFO buffers 1518, 1520, 1522 and 1524 is appended with a marker bit. Thus the marker bit as discussed below with reference to the state machine of FIG. 14 is used to re-align the channels so that the byte order is kept for an embedded target data subpacket.

In the embodiments of FIGS. 5C and 5D, the "pseudo" signal generated by a generation unit and decomposed by the decomposition unit is a "pseudo" STS-3 rate signal. In FIG. 5D, the inputs of the "pseudo" STS-3 generation module 1528 are coupled to receive the data from the outputs of the FIFO buffers 1518, 1520, 1522 and 1524.

One aspect of the invention includes the generation of a "pseudo" signal comprising a uniform rate and comprising a data transmission frame format comprising a payload portion. The payload portion comprises stuff bytes, which comprise null data to fill unused parts of the payload portion, and a plurality of subpackets, the subpackets comprising the data of a non-uniform rate target signal.

FIG. 9 illustrates one embodiment for the data transmission frame format for a "pseudo" STS-3 signal. Each "pseudo" STS-3 data frame comprises six A1/A2 header bytes, sixteen hardware overhead bytes, ten software bytes, a first sequence of null data (stuff #1) embodied as a pseudo random sequence to fill an unused part of the payload portion, sub-packet #1 comprising original non-uniform target signal data, a second pseudo random sequence of null data (stuff #2), and sub-packet #2 also comprising original non-uniform target signal data.

The six A1/A2 header bytes are SONET compliant while the rest of the frame is not. However, valid STS-3 framing bytes are all that is necessary for the receive clock recovery and framer circuit to lock onto the data streams in this embodiment. The A1/A2 header bytes are checked for loss of frame defects. Following the A1/A2 header bytes are sixteen hardware overhead bytes.

The hardware overhead bytes are further broken down into a trace byte (0x01), an alarm notification signal (ANS) flag byte which notifies the receiving circuit that an alarm notification signal is present, a super-frame flag byte which is an extra data indicator notifying the receiving circuit that the current frame contains one or more extra data bytes (see below), a B1 parity byte, three B2 parity bytes which are included to monitor signal quality and are calculated using a SONET-like bit interleaved parity scheme, and nine additional hardware overhead bytes. The additional hardware overhead bytes may be used to pass status information about the target signal.

The software overhead byte are further broken down into two bytes holding the bit-rate code, two bytes holding the ID code, and six additional software bytes, The bit-rate code reflects the bit rate of the target non-uniform signal. The ID codes are composed of path ID codes and channel ID codes. The path ID code is 14 bits wide, and indicates the source of the data streams. The channel ID code is 2 bits wide, and indicates the data channel that is used to carry the data. The additional software overhead bytes can be used to communicate information about the target signal.

The use of a plurality of subpackets reduces latency through the system. In the "pseudo" STS-3 generation example, two sub-packets are used. If the target data were passed through the system in a single block per frame, the latency through the system could be as much as 125 μsec. Breaking the target data into two "sub-packets" reduces the latency in half (62.5 μsec).

The sizes of the subpackets are determined for a certain target rate. The target bit rate is retrieved by the control unit 1600 from the clock and data recovery unit 1512. The flexibility of subpacket size allows a wide range of signals to be carried by the system.

The control unit 1600 determines the stuff byte endpoints based on the target signal. One example of a method for calculating the stuff byte endpoints based on the target signal bit-rate for a "pseudo" STS-3 signal is as follows. The target bit rate is divided by 256 Kbps. Both the integer portion and any remainder are stored. If even, the integer portion is divided into two equal numbers (number A and number B). If the integer portion is an odd number, number A and number B are chosen so that B=A+1. The end of the first sequence of null data or stuff byte endpoint #1 equals 1214 minus number A. The end of the second sequence of null data or stuff byte endpoint #2 equals 2429 minus number B. For example, suppose the input target rate is 155.52 Mbps. The method is carried out as follows:

Target bit rate/(256 Kbps)=155.52 Mbps/256 Kbps=607.5 bytes

Integer portion=607

Remainder=128

Number A=303

Number B=304

Stuff byte endpoint #1=1214−303=911

Stuff byte endpoint #2=2429−304=2125

The non-integer remainder portion will be included in a super frame, which has one or more extra data bytes, the super frame including an extra data indicator such as the Super Frame Flag in FIG. 9.

The above method will work well with signals of bit rates that are multiples of 256 Kbps to be packed into a "pseudo" STS-3 signal, since such bit rates allow the target data stream to be broken evenly into four byte-wide data streams within a 125 μs SONET frame. Target signals with bit rates that are multiples of 64 Kbps but not 128 Kbps carry an odd number of bytes within a 125 μs frame, and thus cannot be evenly distributed among the four channels within one frame period. Target signals with bit rates that are multiples of 8 Kbps but not 64 Kbps carry a certain number of bytes plus some fractions of a byte within a 125 μs frame. To accommodate target signals with frequencies that are only multiples of 8 Kbps, another example using an STS-3 rate illustrating the method is provided.

This translation method is based on the observation that within 32 125 μs frame SONET frames, target signals with frequencies that are multiples of 8 Kbps will always carry enough data bytes that can be distributed evenly into four data streams. Thus after the target bit rate has been recovered, the number of bytes to be inserted into each STS-3 frame is calculated by dividing the target byte rate by 32K, and the insertion is performed by the generation unit 1528. The remainder is stored, for example in a register in the control unit 1600. Once every 32 SONET frames, the generation unit inserts an additional number of bytes (31 bytes maximum in this example).

For example, suppose the input target rate is 186.04 Mbps. The calculations can be carried out as follows:

Target byte rate/(32 Kbps)=Target bit rate/(8*32 Kbps)=186.04 Mbps/256 Kbps=726 23/32 bytes.

Thus 726 bytes are sent out on each of the four "pseudo" STS-3 data streams, with an additional 23 bytes inserted every 32 frames. The frame with the additional bytes will have its extra data indicator set. In 32 SONET frames, the total number of data bytes transferred will be 726*32*4=92928 bytes, plus an additional 23*4=92 bytes, for a total of 93020 bytes. The bandwidth for the target signal in 32 SONET frames equals 186.04 Mbps*125 μs*32=744160 bits, i.e. 93020 bytes. Thus, with this translation method, the target signal is propagated into and out of the system at speed and without data loss.

Figure 11:
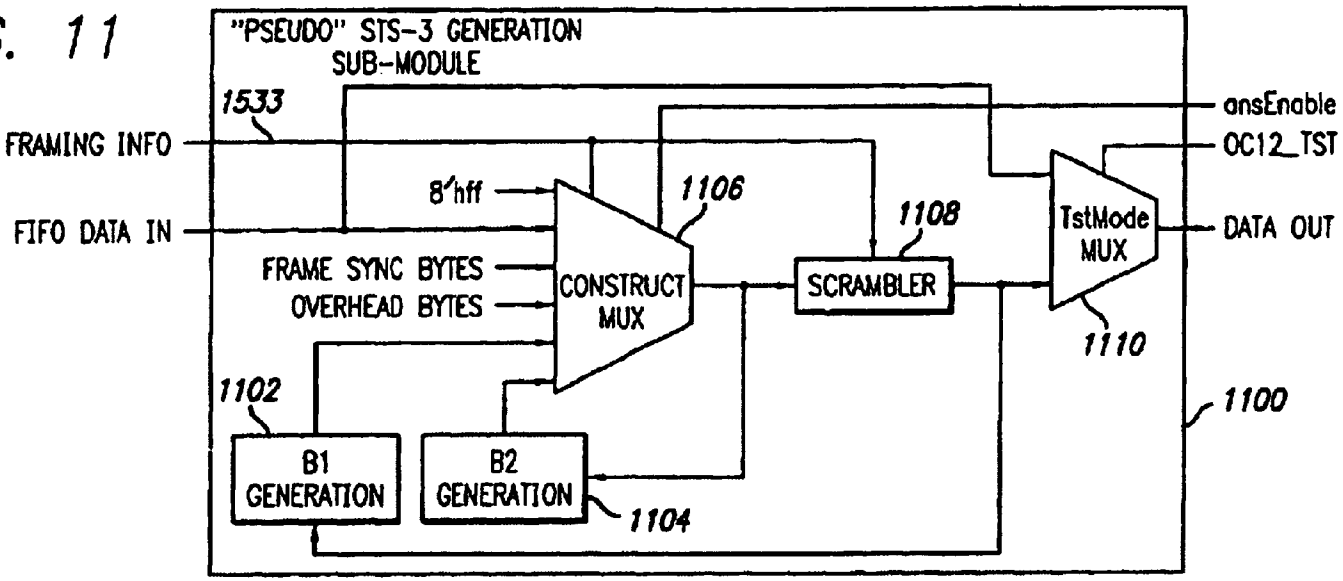
FIG. 11 is a block diagram of an embodiment of a sub-module of the pseudo STS-3 generation module.

The "pseudo" STS-3 generation module 1528 comprises four identical sub-modules or frame generators 1100. Referring now to FIG. 11, an embodiment of a sub-module 1100 will be described. Each sub-module or frame generator 1100 processes one of the data streams and presents it in a "pseudo" STS-3 format at the output. Each sub-module 1100 comprises a first (B1) parity generation block 1102, a second (B2) parity generation block 1104, a construction multiplexer 1106, a scrambler unit 1108, and a test mode multiplexer 1110. The sub-modules 1100 generate "pseudo" STS-3 data streams by first inserting the STS-3 frame sync bytes (i.e. three A1 bytes and three A2 bytes). Next the hardware and software overhead bytes are inserted. The sub-modules 1100 then insert the two strings of stuff bytes, separated by the sub-packets to be transmitted, until the total equals to 2430 (2430 is the number of bytes in a 125 μs frame at an STS-3 rate.) This process is repeated for each STS-3 frame.

The generation of the "pseudo" STS-3 data streams is performed primarily by the construction multiplexer 1106 that has a plurality of inputs and an output. The construction multiplexer 1106 preferably has an input coupled to receive: 1) a constant, 2) the data from FIFOs 1518, 1520, 1522, 1524, 3) the frame sync bytes, 4) the overhead bytes, 5) the output of the first (B1) parity byte generation block 1102, and 6) the output of the second (B2) parity byte generation block 1104. The construction multiplexer 1106 is controlled by an ansEnable signal, and STS-3 framing information signals 1533, which indicate the location of the overhead bytes. When ANS.insertion is enabled, the constant 8'hff is selected to fill the STS-3 frame except for the locations reserved for the frame sync bytes, the trace byte, the ANS flag byte, and the super-frame flag byte. The framing information signals are also used to disable the scrambler unit 1108 during the transmission of these constant filled signals. The output of the construction multiplexer 1106 is input to the scrambler unit 1108.

The scrambler unit 1108 modifies the output of the construction multiplexer 1106 by adding transitions to ensure that there are enough transitions for clock recovery and to monitor DC balance. SONET signals are scrambled to assure an adequate number of transitions (zeros to ones, and ones to zeros) for such purposes as line rate clock recovery at the receiver. In the "pseudo" STS-3 generation module, a scrambler is used to implement the ANS message.

Figure 12:
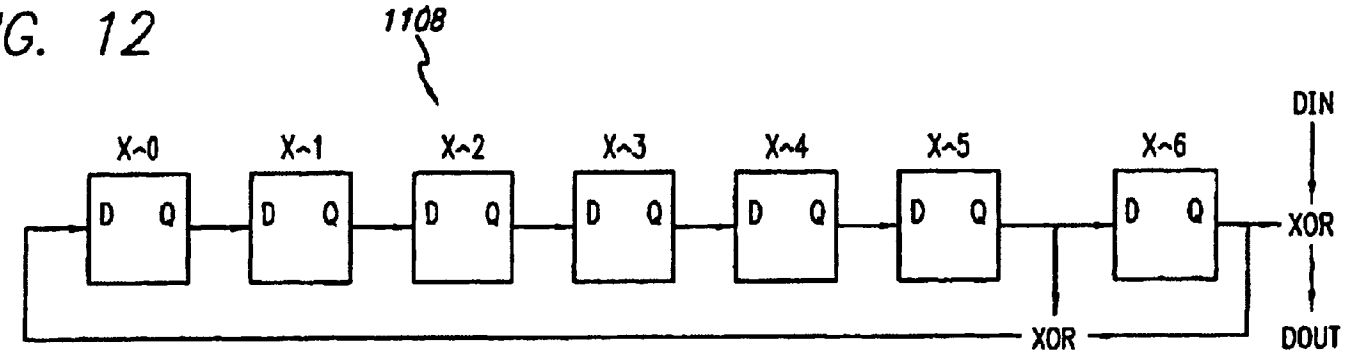
FIG. 12 is a block diagram of an embodiment for a scrambler unit 1108 of the pseudo STS-3 generation of FIG. 11.

One embodiment of a scrambler unit is shown in FIG. 12 that is an implementation as the ANS scrambler for the "Pseudo" STS-3 Generation module. The scrambler scrambles the entire transmitted frame except the framing and the identity bytes. The scrambling is base on the generating polynomial $x^7+x^6+1$. The scrambler is reset to 0x7F at the start of each frame.

Figure 13:
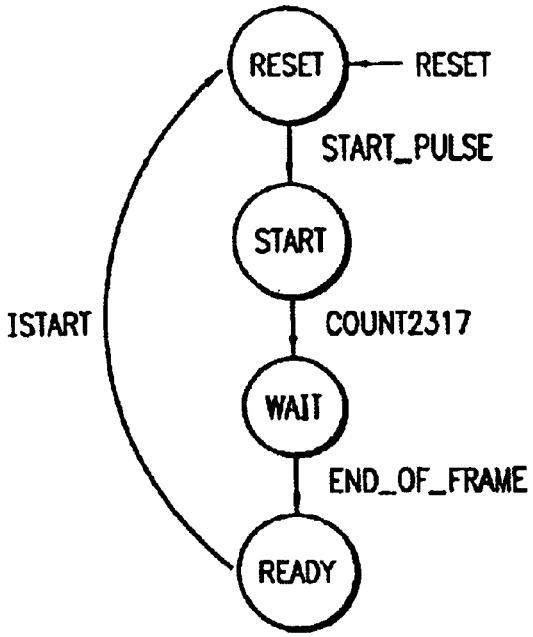
FIG. 13 is a state diagram for the operation of the sub-module of FIG. 11.

The frame information provided on line 1533 from the frame counter 1530 to the "pseudo" STS-3 generation module 1528 is used to determine where the overhead bytes are placed. The frame counter 1530 provides location information 1533 for the overhead bytes within a "pseudo" STS-3 frame. This location information in turn controls the construction multiplexer 1106 of the sub modules 1100 during the construction of "pseudo" STS-3 data streams. The outputs provided by the frame counter 1530 for each state of FIG. 13 are shown in the Table 1 below.

TABLE 1

| Output | Active State |
|---|---|
| FIFO Reset | RESET, START |
| Hold Count | RESET, START, WAIT |

When the "pseudo" STS-3 generation module 1528 first comes out of reset, it will wait for a start signal before it starts the construction process. The start signal is initially controlled by a bit in the control logic 1602. After this start bit is asserted, the "pseudo" STS-3 generation module 1528 will go through the states of the sync start state machine of FIG. 13 to set up the FIFO buffers 1518, 1520, 1522 and 1524 and synchronously start the STS-3 construction process. The state diagram is shown in FIG. 13 and output decoding is shown in Table 1. The sync start process works as follows. When the start signal is asserted, the state machine asserts FIFO reset. The reset signal is held set until the frame counter 1530 has reached a certain point within the STS-3 frame, for example byte 2317. Then reset is released, and the state machine waits for the end of frame while the FIFO buffers 1518, 1520, 1522 and 1524 are pre-filled with data at one-fourth the target byte rate. When the end of frame is reached, the state machine releases hold count, and data is read out of the FIFO buffers 1518, 1520, 1522 and 1524 and inserted into the two sub-packets within the STS-3 frame.

FIG. 14 is a state diagram for an embodiment of the operation of byte order realignment. In one embodiment, a particular sequence of values of the marker bit is used to indicate byte alignment. In the example of FIG. 14, the marker bit sequence is a sequence of two 0's followed by two 1's followed by two 0's, etc. Since the same clock is used to clock data into the four FIFO buffers 1518, 1520, 1522, 1524 corresponding to the four component channels, it can be safely derived that asynchronous release of FIFO reset would at most cause one clock deviation between the four component channels. As soon as the Sync Start state machine reaches the Ready State, the "pseudo" STS-3 generation module 1528 will perform seven FIFO reads to sync up the four byte ordering state machines. (Before the Ready State, the FIFO buffers are pre-filled for 112 STS-3 clock cycles, so that they will have at least eight bytes, in them when the "pseudo" STS-3 generation module 1528 starts the seven reads.) At the end of the seventh read, the "pseudo" STS-3 generation module 1528 checks the current states of the four channels. If any of them are in a state that is the previous state of the other component channels, an additional FIFO read is performed on that component channel so that the bytes in each channel are aligned.

Finally, the output of the "pseudo" STS-3 generation unit 1528 is provided to the four streams to the parallel-to-serial converter 1516 with the resulting output being four low-speed channels 240B, each at a data rate of 155 Mbps (STS-3) and phase-locked to the clock recovered by CDR 512 from the incoming tributary signal.

The CDR unit 1512 outputs the recovered target data rate to an add side synthesizer unit 1532. The add side synthesizer unit 1532 uses the recovered target signal clock to synthesize a uniform rate clock for the pseudo signals to be output. This way, the clock for the pseudo signals is coherent with the target signal clock. In this way, the variable rate output converter can regenerate a target signal clock which is locked to the original target signal input to the variable rate input converter.

FIG. 5F is a block diagram of an embodiment of a phase locked loop (PLL) 1580 circuit embodied within synthesizer unit 1532. The frequency divider integer values are downloaded from a frequency look-up table 1605 in the control unit 1600. Furthermore, the output frequency can be tuned within a tolerance range to a uniform clock signal by the control logic 1602 or under the control of the controller or processor 1606. An example of a tolerance range for the reference STS-3 clock is 155.52 Mbps +/−22 parts per million (ppm). The combination of varying the output clock signal within this tolerance range and selecting optimized values based on the target input rate for the frequency dividers, three in this embodiment, enables a nearly continuous input bit range to be able to be recovered from a uniform rate signal while avoiding phase noise and jitter inherent in traditional designs.

In this embodiment, the target signal clock is received by a frequency divider 1582 with a downloaded integer divisor (/P) and is subsequently divided by frequency divider 1584 with downloaded integer value N2 for a desired integer divide ratio. This divided signal is sent into the phase comparator and filter unit 1584 along with a divided feedback signal of the output uniform clock signal 155.52 Mbps within the tolerance range of +/−22 ppm that was divided by frequency divider 1588. The gain of the signal resulting from the phase comparator and filter may be reduced 1592 and, the signal is then sent to a voltage controlled oscillator 1594 to output a 155.52 Mbps output clock within the tolerance range for the data to be transmitted to the modulator 620.

The low-speed output converter 1570 of FIG. 5C implements the reverse functionality of converter 1575 of FIG. 5D, converting four 155 Mbps low-speed channels 240A into a single outgoing variable rate tributary 160A. In this embodiment, converter 1570 includes a CDR unit 1534 including a framing unit and a serial to parallel converter, a "pseudo" STS-3 decomposition unit 1536, a FIFO 1538, a multiplexer 1540, a parallel-to-serial converter 1544, and E/O converter or transceiver 1544 coupled in series. The "pseudo" STS-3 decomposition unit 1536 also has a frame counter 1542 coupled to provide input.

The CDR unit 1534 performs clock and data recovery of each of the four incoming pseudo signal channels 240A, determines framing for the channels, and converts the channels from serial to byte-wide parallel.

In this example, the "pseudo" signals are "pseudo" STS-3 signals so the decomposition unit is a "pseudo" STS-3 decomposition unit 1536. The decomposition unit 1536 receives the recovered clock of the pseudo signals from the CDR unit 1534 and reads four byte-wide data streams from the CDR unit 1534, strips out the overhead and stuff bytes, and converts them into four data streams that can be used to re-construct the target data stream.

In this embodiment, the byte-interleaved multiplexer 1540 handles the reconstruction of a single variable rate (up to 77.76 MHz in this example) byte-wide data stream from four sub-STS-3 rate signals. A state machine inside the byte-interleaved multiplexer 1540 searches for a valid header byte from each of the four FIFO output data streams, aligns the header bytes of all four streams together, and then enables each FIFO at the appropriate time to provide data for the reconstructed variable rate data stream. Multiplexer 1540 performs the actual combination using TDM, on a byte level, to produce a single byte-wide signal.

Parallel to serial converter 1544 converts the signal from byte-wide parallel to serial. In this embodiment, parallel to serial converter 1544 comprises an embodiment of a system 1904 for preserving the correct data values of NRZ formatted data when the data is to be sent to a recipient expecting RZ formatted data. FIG. 19D, illustrating an embodiment of the system 1904, is discussed below.

E/O converter 1546 converts the signal to electrical form, producing the outgoing tributary 160A that is phase-locked to the incoming clock recovered by CDR 1534.

Figure 16:
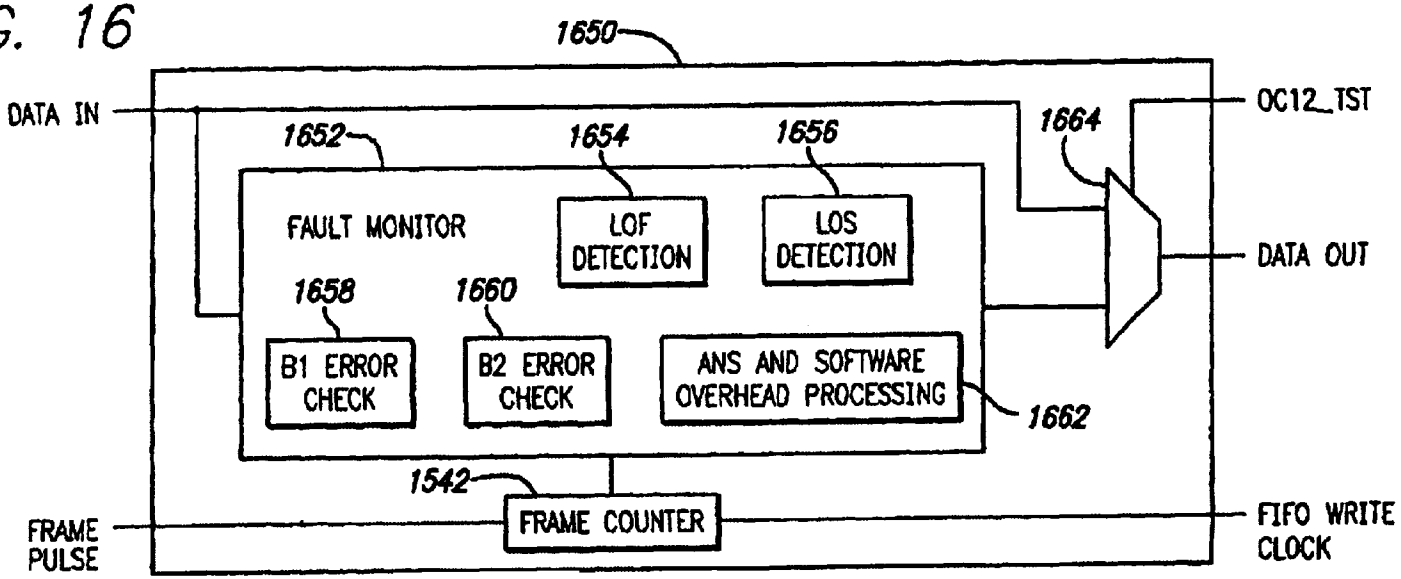
FIG. 16 is a block diagram of an embodiment of the pseudo STS-3 decomposition module.

Referring now also to FIG. 16, the "pseudo" STS-3 decomposition unit 1536 will be described in more detail. The "pseudo" STS-3 decomposition unit 1536 includes four identical sub-modules 1650. Each of these four sub-modules 1650 processes one of the "pseudo" STS-3 data streams, extracts the original data packets, and sends them to the output multiplexer 1664. Each sub-module 1650 comprises two functional blocks. They are the frame counter 1542 and the fault monitor block 1652. The incoming data stream and a frame pulse are sent to the fault monitor block 1652 to extract the framing information. The frame counter 1542 uses the start of frame information to locate the overhead byte positions, and the location of the encapsulated data sub-packet. The frame counter 1542 then generates the FIFO write signal based on the knowledge of the location of the sub packets. The fault monitor block 1652 preferably comprises several units 1654, 1656, 1658, 1660, 1662 that detect errors in data transmission through the variable rate output converter 1570. The data output is a delayed version of the data input. The output data stream is 9 bits wide, including the bit holding the data marker that is synchronized with the first byte of the sub-packet within each STS-3 frame.

Each of the "pseudo" signal generation and "pseudo" signal decomposition units may be embodied as a field programmable gate array.

The software overhead processing unit 1662 is used to check for ANS alarms and to extract software overhead bytes. Software overhead bytes that are transmitted within a "pseudo" STS-3 frame include the ID codes, the extra data indicator and the bit-rate information. The ID codes and bit-rate information are extracted by this block and presented to the control unit 1600 to be compared with the expected values.

Once the "pseudo" STS-3 decomposition unit 1536 de-constructs the four "pseudo" STS-3 signals, they are provided to and stored in the buffer unit 1538. In this embodiment, the buffer unit 1538 is four independent 512x9 asynchronous FIFO buffers. As discussed with respect to the buffer unit 1515, these FIFO buffers are used to compensate for the frequency differences between the target clock and the STS-3-rate clock. In addition, the FIFO buffers are also used to compensate for the propagation skew between the four tributary channels.

Figure 17:
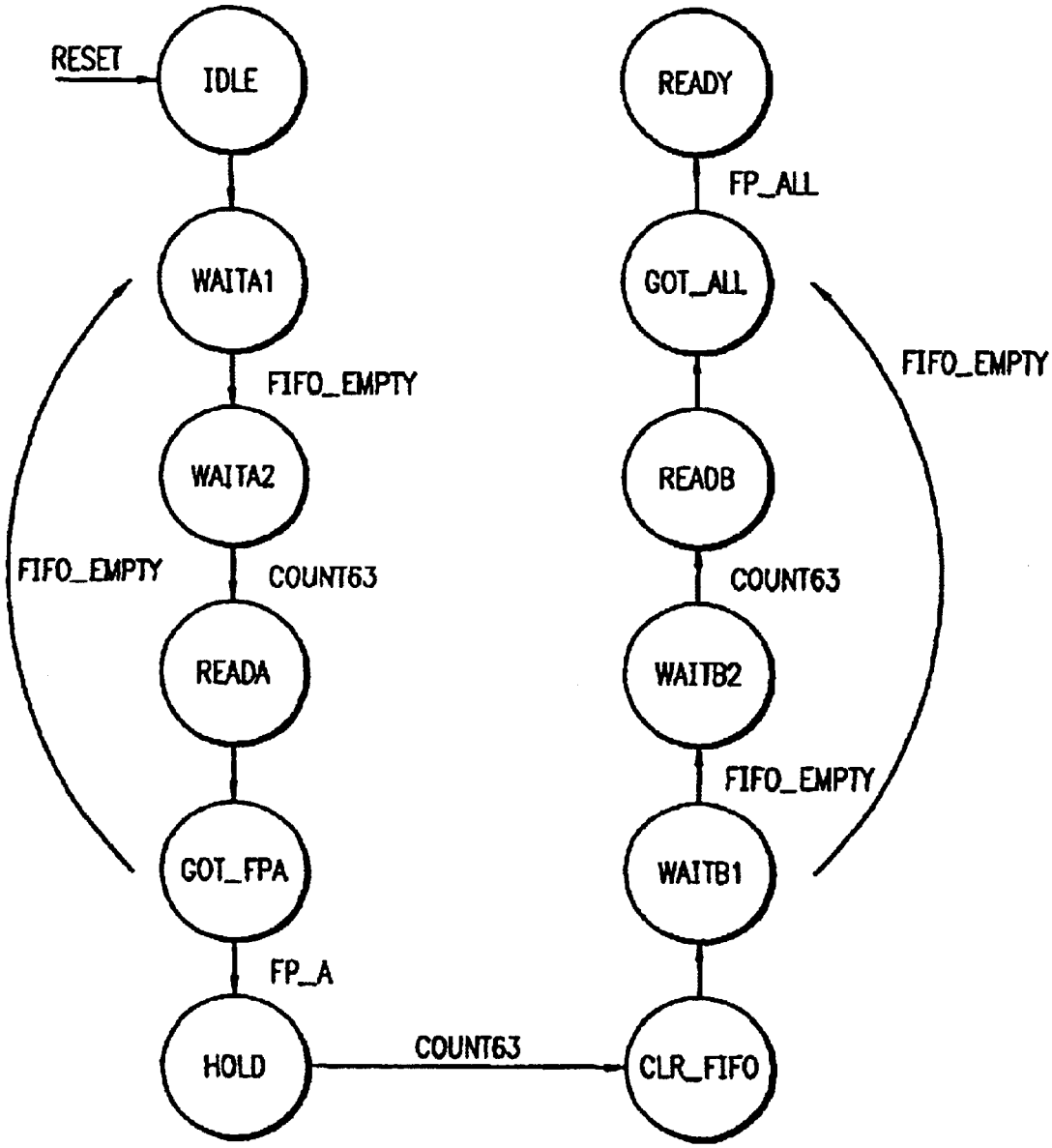
FIG. 17 is a state diagram for an embodiment of the operation of the byte multiplexer of 5C.

Once stored in the FIFO module 1538, the data streams can be read out of the buffer unit 1538 by the byte multiplexer 1540. The byte multiplexer 1540 preferably comprises a FIFO read controller, a 4:1 byte multiplexer, and a synchronization state machine necessary to perform the byte multiplexing function. A derived clock with ¼ the frequency of the byte-wide target, non-uniform signal, phase locked to one of the "pseudo" STS-3 inputs, is routed to this module from the control unit 1600. This clock is used to clock the outputs of the re-synchronization FIFO buffers. The FIFO read enables are enabled and disabled by the synchronization state machine. Referring also now to FIG. 17 a state diagram for the operation of the byte multiplexer 1540. The byte multiplexer 1540 preferably provides one of three output control signals as indicated by the outputs and state in Table 2.

TABLE 2

| Output | Active State |
|---|---|
| GET_FF | GOT_FPA, GOT_ALL |
| FIFO_RESET | IDLE, CLR_FIFO |
| READ | READA, GOT_FPA, READB, GOT_ALL, READY |

The byte synchronization state machine is designed to locate the data marker byte for each of the sub-STS-3 rate data streams, re-synchronize them, and clock the FIFO outputs at the appropriate time to get the data into the byte multiplexer. The propagation skews between the "pseudo" STS-3 data streams, and thus the sub-STS-3 rate data streams, are specified to be less than 512 STS-3 byte time. This could translate into less than 100 sub-STS-3-rate byte time for target signals with data rates that are close to the STS-1 rate. Thus, 64-byte time is picked in one example as the max propagation skews allowed to accommodate target signal rates that range from STS-1 to STS-3. When commanded to "find sync", the state machine performs the following steps:

1. Clear all FIFOS.
2. Allow 2–3 bytes to be written into each FIFO so that they do not go "empty"
3. Read the first FIFO output, denoted "A" here until a frame marker is found.
4. Let all FIFOs fill 64 byte.
5. Clear all FIFOs.
6. Allow 2–3 bytes to be written into each FIFO so that they do not go "empty"
7. Read all FIFOs until all framing pulses are found.
8. Wait for the FIFOs to be pre-filled with the predetermined byte count.
9. Enable byte multiplexer and clock FIFOs continuously unless reset pulse is applied.

Figure 18:
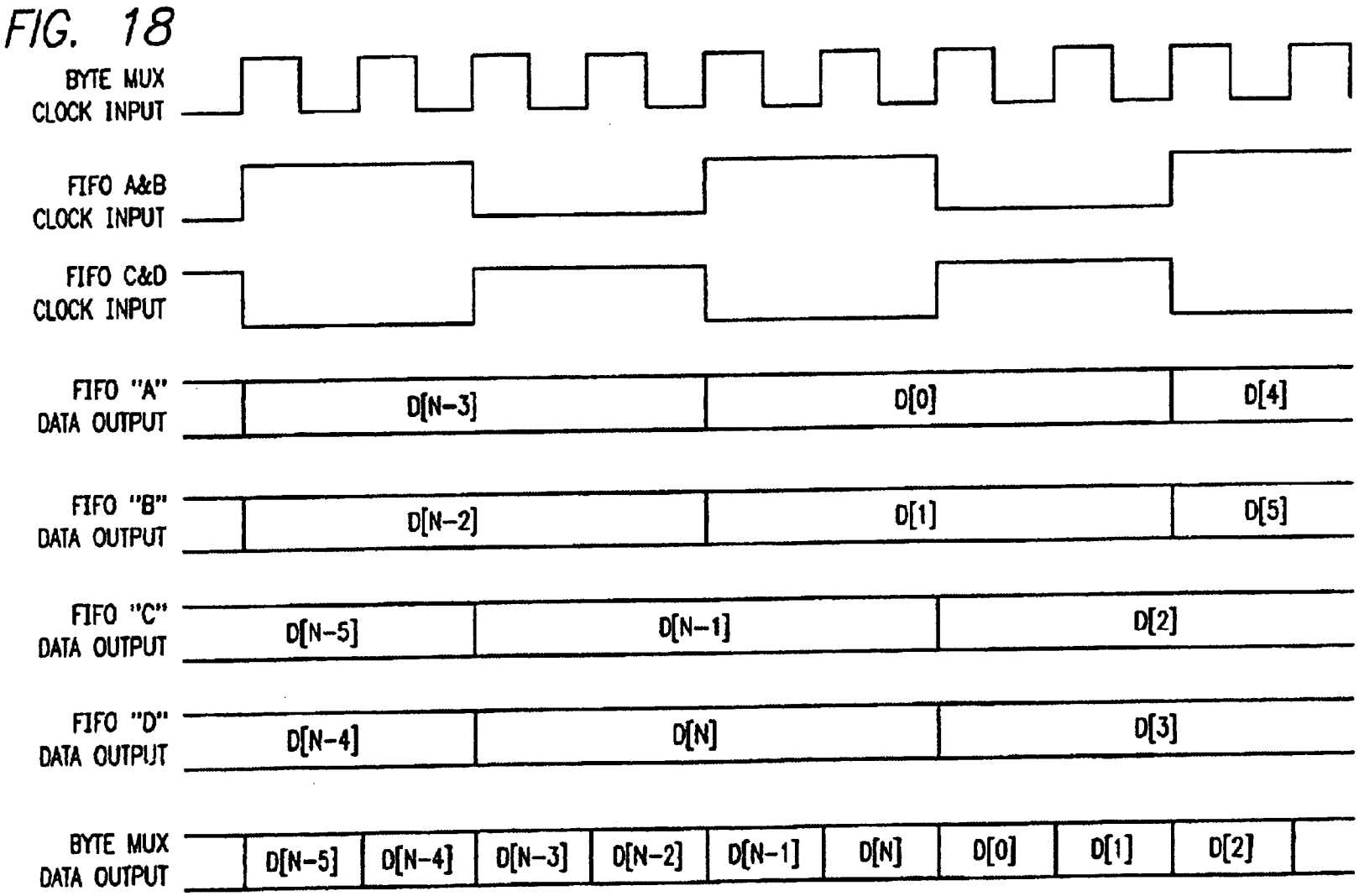
FIG. 18 illustrates one example of a timing diagram of byte multiplexing.

This process ensures that all four sub-STS-3 rate data streams are read out in sequence. When the synchronization state machine has reached the final state, the byte multiplexer interleaves the four sub-STS-3 rate data streams back into one byte-wide data stream. This output is routed to the parallel-to-serial converter 1544. The 4:1 byte multiplex timing is shown FIG. 18.

FIG. 5E is a block diagram of an embodiment of a phase locked loop (PLL) circuit embodied in synthesizer unit 1550. This synthesizer unit uses the recovered uniform rate to regenerate the target non-uniform signal. FIG. 5E illustrates a unit comprising two phase locked loop circuits. The first circuit is used to generate a "clean" uniform rate signal by removing excess noise and jitter from the incoming pseudo signal. In this embodiment, the cleaned up signal is then used by the second circuit in generating the target signal.

The first phase locked loop circuit comprises a phase comparator and filter 1552 followed by a gain module 1554 and a voltage controlled oscillator 1556 whose output is fed back to the phase comparator and filter unit 1552. The cleaned up uniform clock signal is then input to the second phase locked loop circuit.

The second PLL circuit comprises a phase lock loop 1558, a gain module 1563, a voltage controlled oscillator 1566 and frequency dividers 1572 and 1568.

As discussed previously, the variable rate converter enables a nearly continuous output bit rate range to be synthesized from a uniform rate signal while avoiding phase noise and jitter inherent in traditional designs by the synthesizer units being controlled by the combination of relaxing the uniform rate within the tolerance range for the incoming pseudo signal and selecting values of integer divisors in the frequency dividers optimized for the non-uniform rate signal. An example of a tolerance range for the incoming pseudo STS-3 signal is 155.52 Mbps +/−22 parts per million (ppm).

In the embodiment shown in FIG. 5E, the cleaned up uniform rate clock 155.52 Mbps is received by frequency divider 1560. The value of integer divisor R associated with the target frequency of the incoming non-uniform signal has been downloaded from a look-up table 1605 in the control unit 1600. The divided reference signal and a feedback signal from frequency divider 1564, whose integer divider N1 has also been downloaded from the look-up table 1605 enter phase comparator and filter 1562. The gain of the signal may be adjusted 1563. The signal is sent to an oscillator 1566. The output signal of oscillator 1566 is fed to two frequency dividers 1572 and 1568. The output frequency divider has a programmed value of M also read from the look-up table 1605 to create different data length (e.g. bit, byte, word) rates. The intermediate frequency divider 1572 divides the signal by 2 in this embodiment and the signal is fed back to feedback frequency divider 1564 as an input to the phase comparator.

As previously discussed, recovery and transmission of RZ formatted data using NRZ devices is highly desirable. Those skilled in the art will appreciate that the elements or individual units depicted in the embodiments of the systems illustrated in FIGS. 19C to 19E may be implemented individually or in any combination in software, hardware, firmware, or any combination thereof.

FIG. 19C illustrates an embodiment of a system 1902 for recovering the data of a Return-to-Zero (RZ) signal using a Non-Return-to-Zero (NRZ) clock and data recovery unit (CDR) according to the present invention. In this embodiment, the system 1902 comprises a NRZ CDR 1910, a deserializer 1916 and a zero discard state machine 1922.

The NRZ CDR 1910 receives a signal comprising a serial RZ formatted data stream 1908. The NRZ CDR 1910 recovers an intermediate clock signal 1914 from the signal 1908 as if the signal's data were NRZ formatted. As discussed above with reference to FIG. 19B, the NRZ CDR recovers a clock and data under the assumption that the data is encoded in NRZ format. As a result of the NRZ format representing a logic '1' by maintaining a 'high' voltage level for an entire clock period, the pulse period for a logic '1' of an incoming RZ formatted signal is interpreted as the clock period for the signal. The intermediate clock therefore represents twice the data rate of the incoming signal 1908 as was illustrated in FIG. 19B.

The NRZ CDR unit 1910 uses the intermediate clock rate 1914, which is twice the clock rate of the incoming signal, to recover the data from the incoming signal 1908, an intermediate data stream, under the assumption that the data is NRZ formatted. As shown in FIG. 19B and discussed above, the recovered intermediate data stream 1912 now has an additional zero at every other bit. For example, the bit sequence 10101 is now represented as 1000100010.

One embodiment for implementing the aspect of the invention comprising discarding the extra zeroes and dividing the intermediate clock to recover the data rate of the input signal 1908 comprises a clock divider 1916, which in this embodiment comprises the deserializer 1916, and the zero discard state machine 1922.

The data stream 1912 and the intermediate clock signal 1914 are outputted to the deserializer 1916. The deserializer 1916 converts the recovered bit sequence 1912 from a serial bit stream to a plurality of parallel intermediate bit streams, in this example a parallel byte stream 1918. In this embodiment, the deserializer divides the intermediate clock 1914 by eight to form a parallel clock signal, in this example, a byte clock signal 1920.

In this embodiment, the zero discard state machine 1922 receives the parallel byte stream 1918 and the byte clock signal 1920 as inputs. The state machine 1922 discards the extra zeroes in each byte resulting in a 4-bit byte data stream representing the data values of the received return-to-zero formatted signal. When clocked out by the divided intermediate clock signal 1926, the resulting data stream will be clocked at the data rate of the original RZ signal. If serialized, this resulting data stream would have the same clock rate as well as data rate as the input clock signal 1908. The zero discard state machine 1922 may be embodied as control logic, which may comprise program controlled logic, and which may be implemented in software, hardware, firmware or any combination thereof.

Figure 19E:
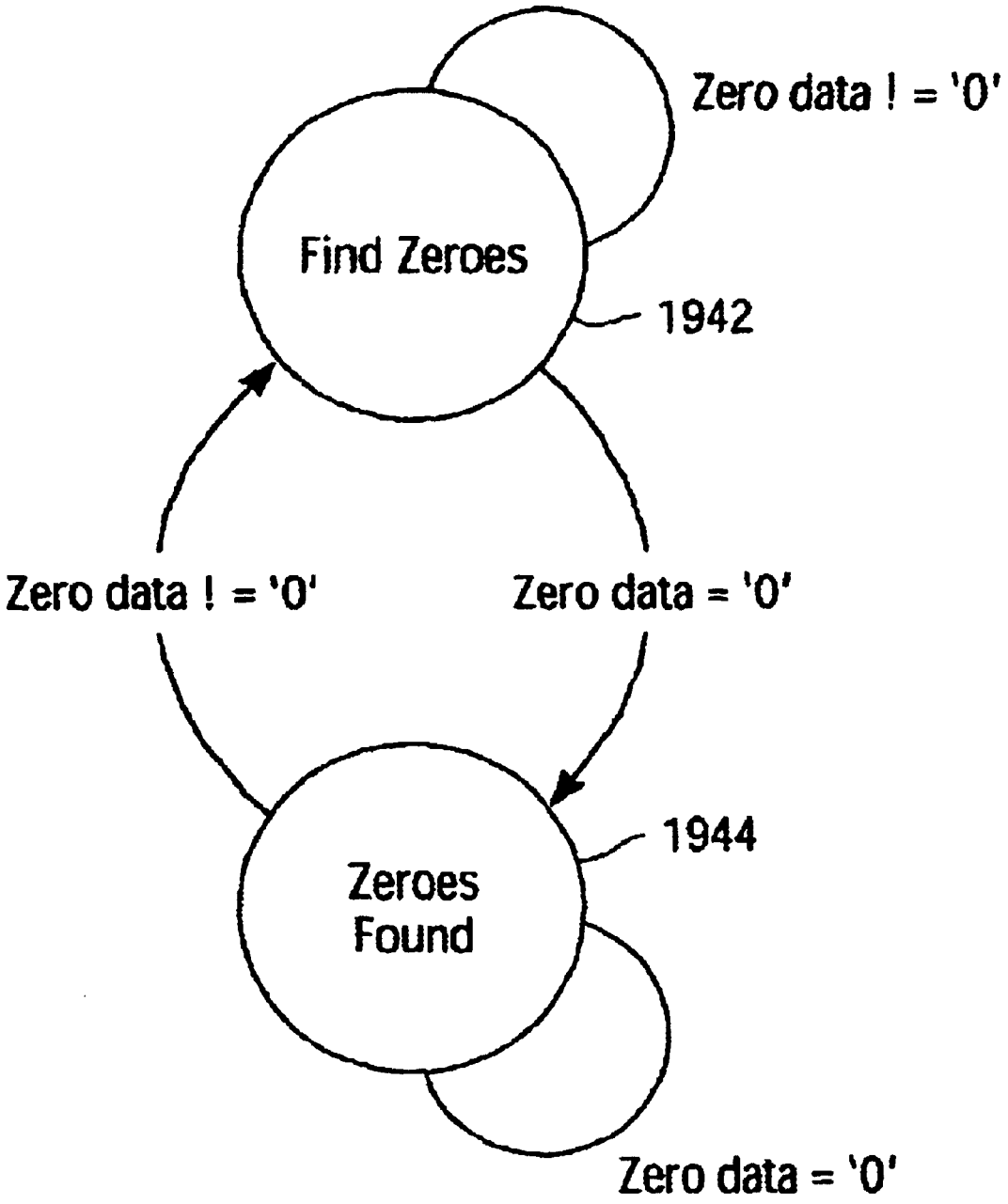
FIG. 19E illustrates an embodiment of a zero discard state machine according to the present invention.

FIG. 19E illustrates an embodiment of the zero discard state machine 1922 according to the present invention comprising a "Find Zeroes" state 1942 and a "Zeroes Found" state 1944. The bit stream can be considered two sets of data. Each set is made up of every other bit, but the starting points are separated by a bit. The state machine first determines which set of data comprises the bits that stay at a logical '0'. For example, in the sequence 1000100010, there are two sets of data, 10101 and 00000, so that the set of data beginning at the second bit in this sequence are the zeroes to be discarded.

The Find Zeroes state 1942 samples the recovered data 1918 searching for the set of data bits that are the zeroes to be discarded which will be referred to as the zero data set. Once sampling indicates the zero data set, the state machine transitions to a Zeroes Found state and proceeds to discard the zero data set. If a non-zero bit is detected in the zero data set, the state machine resets to the Find Zeroes state 1942.

As discussed previously, the system of FIGS. 19C and 19E may be embodied as part of the clock and data recovery units 512, 1512 of FIGS. 5B and 5D. The control logic for discarding the extra zeroes may also be embodied in a separate programmable logic device, the control unit 1600 of FIG. 15, or in control logic accessible by the embodiments of an input converter illustrated in FIGS. 5B and 5D.

FIG. 19D illustrates an embodiment of a system for implementing another aspect of the invention in which the correct data values of NRZ formatted data are preserved when the data is to be sent to a recipient, for example a tributary, expecting RZ formatted data by inserting zeroes after every bit, and multiplying the clock to twice the data rate.

The system 1904 comprises control logic 1932 for inserting a zero after every bit resulting in a data stream in which every other of the bits is a zero, a frequency multiplier 1934 and output circuitry 1938. In this embodiment, the output circuitry 1938 comprises a serializer, and the frequency multiplier 1934 comprises a phase locked loop. The system of FIG. 19D may be embodied as part of the parallel to serial converter units 522, 1544 of the embodiments of an output converter illustrated in FIGS. 5A and 5C.

The control logic for inserting a zero after every bit 1932, may also be embodied in a separate programmable logic device, the control unit 1600 of FIG. 15, or in control logic accessible by the embodiments of an output converter illustrated in FIGS. 5A and 5C.

The control logic 1932 receives as input a non-return-to-zero formatted data stream 1908. In this embodiment, the logic receives the data as 4-bit parallel bytes and a clock signal 1930 at one-fourth the data rate of the incoming signal whose data is NRZ formatted. Zeroes are inserted after every bit so that the output is an 8-bit byte data stream 1936 with the inserted zeroes.

Other data lengths can also be used. The data stream with inserted zeroes is comprised of data lengths which are twice the input data length in this embodiment. For example, if the input were processed as 16 bit words, the output would be 32 bit words.

The data stream with the inserted zeroes 1936 is sent to a serializer 1938.

The clock signal 1930, in addition to being received by the insert zeroes control logic 1932 is also forwarded to a frequency multiplier 1934. The frequency multiplier generates an output clock signal 1942 at twice the incoming NRZ data rate.

In this embodiment, the serializer 1938 receives the data stream 1936 with the inserted zeroes from the logic 1932, the incoming data rate clock signal 1930, and the output clock signal 1940 having a rate at twice the incoming NRZ data rate from the frequency multiplier 1934. The serializer 1938 captures the data bytes 1936 incoming at the clock rate of one-fourth the incoming NRZ data rate and converts the bytes to a serial bit stream output at the output clock rate 1940, which is twice the incoming NRZ data rate, from the frequency multiplier. Although the system 1904 is processing the incoming signal as if it were a NRZ signal, the data signal output will look like the RZ signal of FIG. 19A. An RZ clock and data recovery unit at a tributary receiving the signal from the serializer 1938 will interpret the data correctly.

Figure 6A:
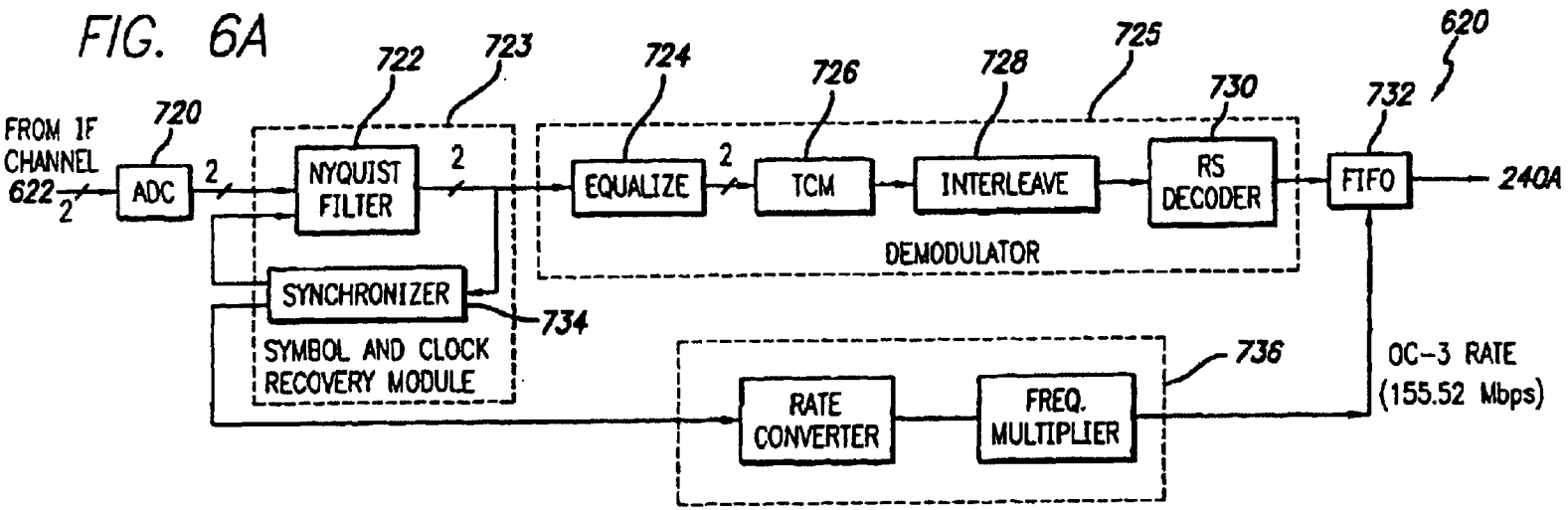
FIG. 6A is a block diagram of an embodiment of demodulator 620.
Figure 6B:
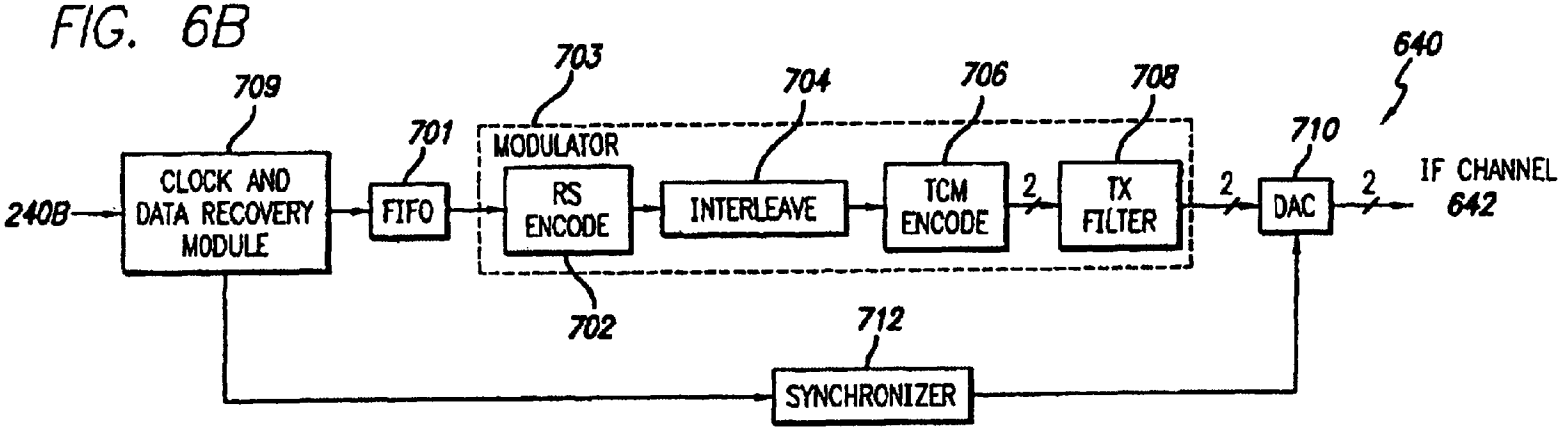
FIG. 6B is a block diagram of an embodiment of modulator 640.

Referring to FIG. 6B, modulator 640 modulates the 64 incoming low-speed channels 240B to produced 64 QAM-modulated channels which are input to the IF up-converter 642. For convenience, the QAM-modulated channels shall be referred to as IF channels because they are inputs to the IF up-converter 642. They shall also be referred to as symbol channels because the modulation step converts the incoming stream of data into a corresponding stream of symbols. In this embodiment, each low-speed data channel 240 is modulated separately to produce a single low-speed symbol channel and FIG. 6B depicts the portion of modulator 640 that modulates one low-speed channel. Modulator 640 in its entirety would include 64 of the portions shown in FIG. 6B. For convenience, the single channel shown in FIG. 6B shall also be referred to as a modulator 640. Modulator 640 includes a clock and data recovery module 709 (CDR 709), FIFO 701, modulator 703, and a D/A converter 710 coupled in series. The modulator 703 further includes a Reed-Solomon encoder 702, an interleaver 704, a trellis encoder 706, a digital filter 708 coupled in series. Modulator 640 also includes a synchronizer 712 coupled between the CDR 709 and the filter 708.

Modulator 640 operates as follows. CDR 709 receives the incoming low-speed data channel 240B and recovers both a clock and data from the data channel. The clock, which shall be referred to as a data clock, is transmitted to synchronizer 712. In this embodiment, the CDR 709 includes a phase-locked loop so that the recovered data clock is phase-locked to the incoming low-speed data channel. The recovered data is transmitted to FIFO 701, where it is buffered.

The modulator 703 receives the data from FIFO 701 and generally applies a modulation, converting the data channel to a symbol channel. More specifically in this embodiment, Reed-Solomon encoder 702 encodes the low-speed channel 240B according to a Reed-Solomon code. Programmable Reed-Solomon codes may be used for maintaining very low BER (typ. lower than $10^{-12}$) with low-overhead (typ. less than 10%). This is particularly relevant for optical fiber systems because they generally require low bit error rates (BER) and any slight increase of the interference or noise level will cause the BER to exceed the acceptable threshold. For example, a Reed-Solomon code of (204,188) can be applied for an error correction capability of 8 error bytes per every 204 encoded bytes.

The interleaver 704 interleaves the digital data string output by the Reed-Solomon encoder 702. The interleaving results in more robust error recovery due to the nature of trellis encoder 706. Specifically, forward error correction (FEC) codes are able to correct only a limited number of mistakes in a given block of data, but convolutional encoders such as trellis encoder 706 and the corresponding decoders tend to cause errors to cluster together. Hence, without interleaving, a block of data which contained a large cluster of errors would be difficult to recover. However, with interleaving, the cluster of errors is distributed over several blocks of data, each of which may be recovered by use of the FEC code. Convolution interleaving of depth 0 may be used in order to minimize latency.

The trellis encoder 706 applies a QAM modulation, preferably 16 state QAM modulation, to the digital data stream output by the interleaver 704. The result typically is a complex baseband signal, representing the in-phase and quadrature (I and Q) components of a QAM-modulated signal. Trellis encoder 706 implements the QAM modulation digitally and the resulting QAM modulated signal is digitally filtered by filter 708 in order to reduce unwanted sidelobes and then converted to the analog domain by D/A converter 710.

Synchronizer 712 receives the data clock generated by CDR 709 and generates a symbol clock synchronized to the data clock. The symbol clock is used to time the output of modulator 703. In this way, the low-speed symbol channel generated by modulator 703 will be synchronized to the incoming low-speed data channel 240B, thus preserving the original timing information and preventing the excess accumulation of jitter. More specifically, in this embodiment, the incoming data channel 240B has a bit rate of 155 Mbps. Since 16 state QAM modulation and error correction is used, every three data bits are converted into one symbol so the corresponding symbol channel has a symbol rate of 56.5 million symbols per second. Similarly, the recovered data clock has a clock rate of 155 MHz while the corresponding symbol clock has a rate of 56.5 MHz. The synchronizer 712 includes a rate-converter which converts the rate of the data clock to that of the symbol clock, thus generating the symbol clock. The synchronizer 712 also includes a phase-locked loop which ensures that the symbol clock is synchronized to the data clock. The output of the synchronizer 712 is coupled to a timing control input for modulator 703. Hence, the symbol clock is used to time the output of symbols from modulator 703, thus ensuring that the resulting low-speed symbol channel is synchronized to the incoming low-speed data channel 240B.

The resulting low-speed symbol channel is a pair of differential signals, representing the I and Q components of the QAM-modulated signal, which are synchronized to the original data channel. In alternate embodiments, the QAM modulation may be implemented using analog techniques.

Referring to FIG. 6A, demodulator 620 reverses the functionality of modulator 640, recovering a low-speed channel 240A from an incoming low-speed symbol channel (i.e., analog I and Q components in this embodiment) received from the IF down-converter 622. Demodulator 620 includes an A/D converter 720, a symbol and clock recovery module 723, demodulator 725, and FIFO 732 coupled in series. The demodulator 725 further includes an equalizer 724, trellis decoder 726, deinterleaver 728, and Reed-Solomon decoder 730 in series. The symbol and clock recovery module 723 includes a digital Nyquist filter 722 and a synchronizer 734 which forms a loop with Nyquist filter 722. Demodulator 620 further includes another synchronizer 736 which is coupled between clock recovery module 723 and FIFO 732.

Demodulator 620 operates as FIG. 6A would suggest. The A/D converter 720 converts the incoming symbol channel to digital form. The recovery module 723 recovers symbols and timing from the symbol channel. Nyquist filter 722, synchronized by synchronizer 734, reduces unwanted artifacts from the A/D conversion, with the recovered symbols transmitted to demodulator 725. The recovered clock, which shall be referred to as a symbol clock, is phase-locked to the received low-speed symbol channel by a phase-locked loop in module 723 and is transmitted to synchronizer 736.

Equalizer 724 applies equalization to the filtered symbols, for example to compensate for distortions introduced in the IF signal processing. Trellis decoder 726 converts the I and Q complex signals to a digital stream and deinterleaver 728 reverses the interleaving process. Reed-Solomon decoder 730 reverses the Reed-Solomon encoding, correcting errors which have occurred. The recovered data is buffered into FIFO 732.

Synchronizer 736 times the release of data from FIFO 732, ensuring that the resulting low-speed data channel is synchronized to the incoming low-speed symbol channel. In this embodiment, synchronizer 736 includes a rate-converter followed by a frequency multiplier. The recovered symbol clock has a rate of 56.5 MHz. The rate-converter changes this rate to 19.44 MHz. The frequency multiplier performs a times eight to generate a data clock of frequency 155.5 MHz. Phase-locked loops in both the rate-converter and the frequency multiplier ensure that the data clock is phase-locked to the symbol clock, which is also phase-locked to the received symbol channel.

Considering FIGS. 5B, 6B, 6A and 5A together, or alternatively FIGS. 5D, 6B, 6A and 5C note that end-to-end timing is preserved through the use of synchronizers, specifically phase-locked loops in this embodiment although other types of synchronizers may be used. Working backwards from the receive-side to the transmit-side, in FIG. 5A or 5C, the CDR 528 ensures that the outgoing tributary 160A is synchronized to the incoming low-speed data channels 240A. In FIG. 6A, the timed FIFO 732 ensures that the recovered low-speed data channel 240A is synchronized to the receive-side data clock generated by synchronizer 736. Synchronizer 736 ensures that this data clock is synchronized to the receive-side symbol clock. Clock recovery module 723 ensures that the symbol clock is synchronized to the received low-speed symbol channel. On the transmit side, in FIG. 6B, modulator 703 ensures that the outgoing low-speed symbol channel is synchronized to the symbol clock generated by synchronizer 712. Synchronizer 712 ensures that the symbol clock is synchronized to the data clock. Clock recovery module 709 ensures that the data clock is synchronized to the received low-speed data channel 240B. In FIG. 5B, CDR 512 ensures that the low-speed data channels 240B are synchronized to the incoming tributary 160B. Thus, the recovered low-speed data channels 240A will maintain the original timing of low-speed data channels 240B, and the recovered tributaries 160A will also maintain the original timing of incoming tributaries 160B.

Referring again to transmitter 210B, IF up-converter 642 receives the 64 low-speed symbol channels from modulator 640. Together, IF up-converter 642 and RF up-converter 644 combine these 64 symbol channels into a single RF signal using FDM techniques. In essence, each of the low-speed symbol channels (or equivalently, each of the 64 low-speed data channels 240B) is allocated a different frequency band within the RF signal. The allocation of frequency bands shall be referred to as the frequency mapping, and, in this embodiment, the symbol channels may also be referred to as IF channels since they are inputs to IF up-converter 642 or as FDM channels since they are the channels which are FDM multiplexed together. The multiplexing is accomplished in two stages. IF up-converter 642 first combines the 64 IF channels into 8 RF channels, so termed because they are inputs to the RF up-converter 644. In general, the terms "IF" and "RF" are used throughout as labels rather than, for example, indicating some specific frequency range. RF up-converter 644 them combines the 8 RF channels into the single RF signal, also referred to as the electrical high-speed channel.

Figure 7A:
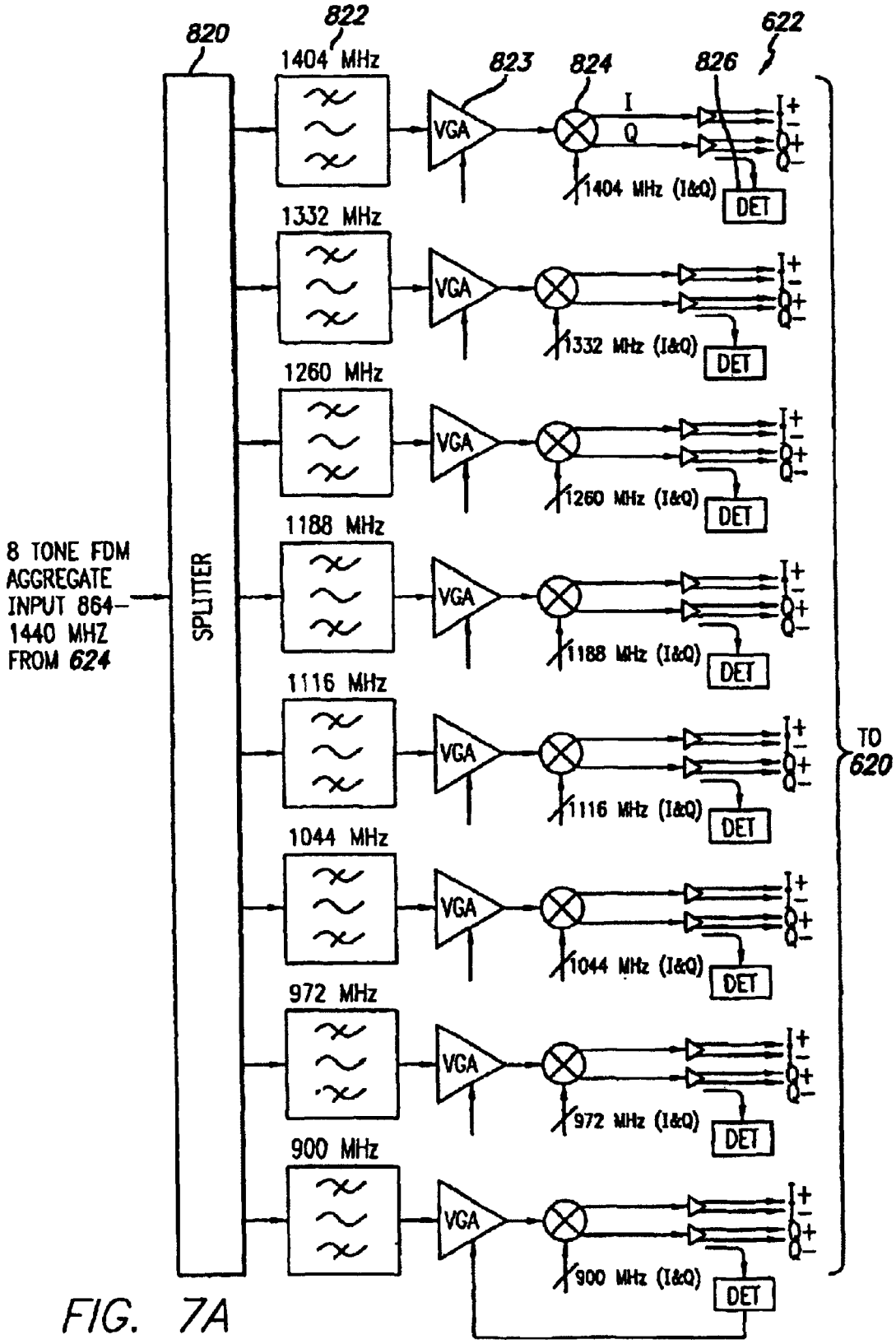
FIG. 7A is a block diagram of an embodiment of IF down-converter 622.
Figure 7B:
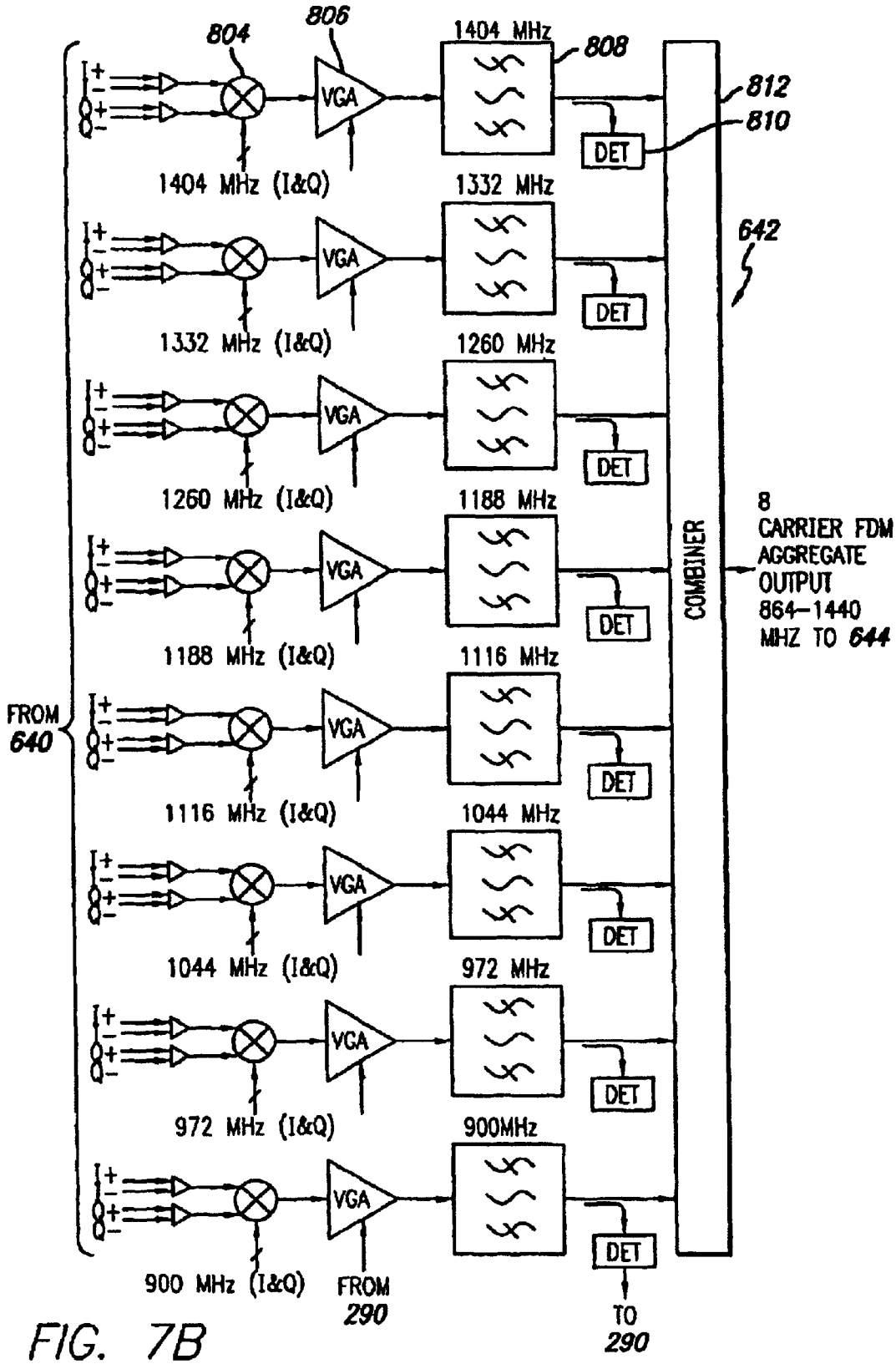
FIG. 7B is a block diagram of an embodiment of IF up-converter 642.

Referring to FIG. 7B, IF up-converter 642 includes eight stages (identical in this embodiment, but not necessarily so), each of which combines 8 IF channels into a single RF channel. FIG. 7B depicts one of these stages, which for convenience shall be referred to as an IF up-converter 642. IF up-converter 642 includes eight frequency shifters and a combiner 812. Each frequency shifter includes a modulator 804, a variable gain block 806, a filter 808, and a power monitor 810 coupled in series to an input of the combiner 812.

IF up-converter 642 operates as follows. Modulator 804 receives the IF channel and also receives a carrier at a specific IF frequency (e.g., 1404 MHz for the top frequency shifter in FIG. 7B). Modulator 804 modulates the carrier by the IF channel. The modulated carrier is adjusted in amplitude by variable gain block 806, which is controlled by the corresponding control system 290, and bandpass filtered by filter 808. Power monitor 810 monitors the power of the gain-adjusted and filtered signal, and transmits the power measurements to control system 290.

In an embodiment, each IF channel has a target power level based on the estimated gain due to transmission through system 100. Control system 290 adjusts the gain applied by variable gain block 806 so that the actual power level, as measured by power monitor 810, matches the target power level. The target power level may be determined in any number of ways. For example, the actual power level may be required to fall within a certain power range or be required to always stay above a minimum acceptable power. Alternately, it may be selected to maintain a minimum channel error rate or to maintain a channel error rate within a certain range. In this embodiment, variable gain block 806 adjusts the power of each low-speed channel 240.

The inputs to combiner 812 are QAM-modulated IF signal at a specific frequency. However, each frequency shifter uses a different frequency (e.g., ranging in equal increments from 900 MHz to 1404 MHz in this example) so combiner 812 simply combines the 8 incoming QAM-modulated signal to produce a single signal (i.e., the RF, channel) containing the information of all 8 incoming IF channels. In this example, the resulting RF channel covers the frequency range of 864–1440 MHz.

Figure 8A:
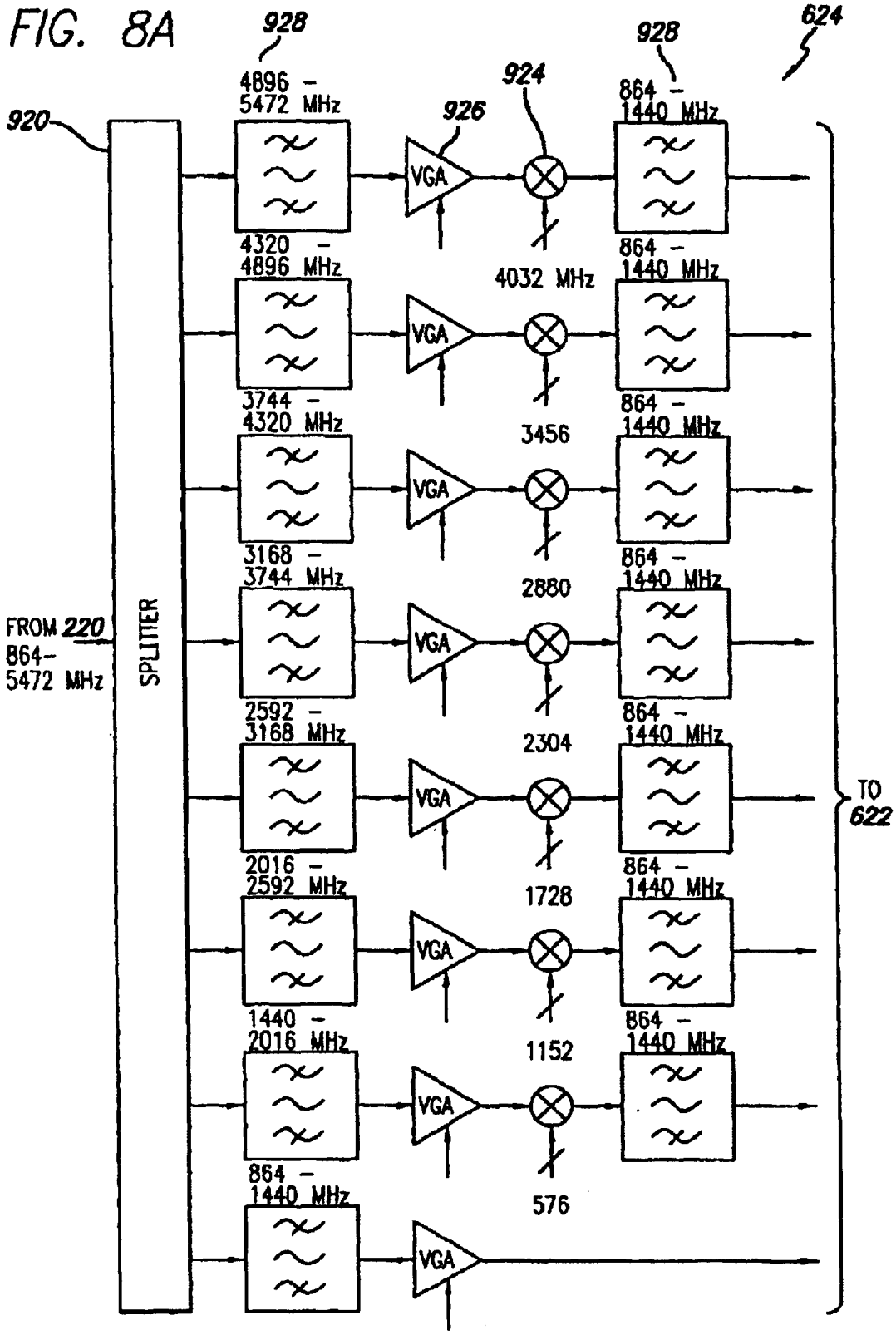
FIG. 8A is a block diagram of an embodiment of RF down-converter 624.
Figure 8B:
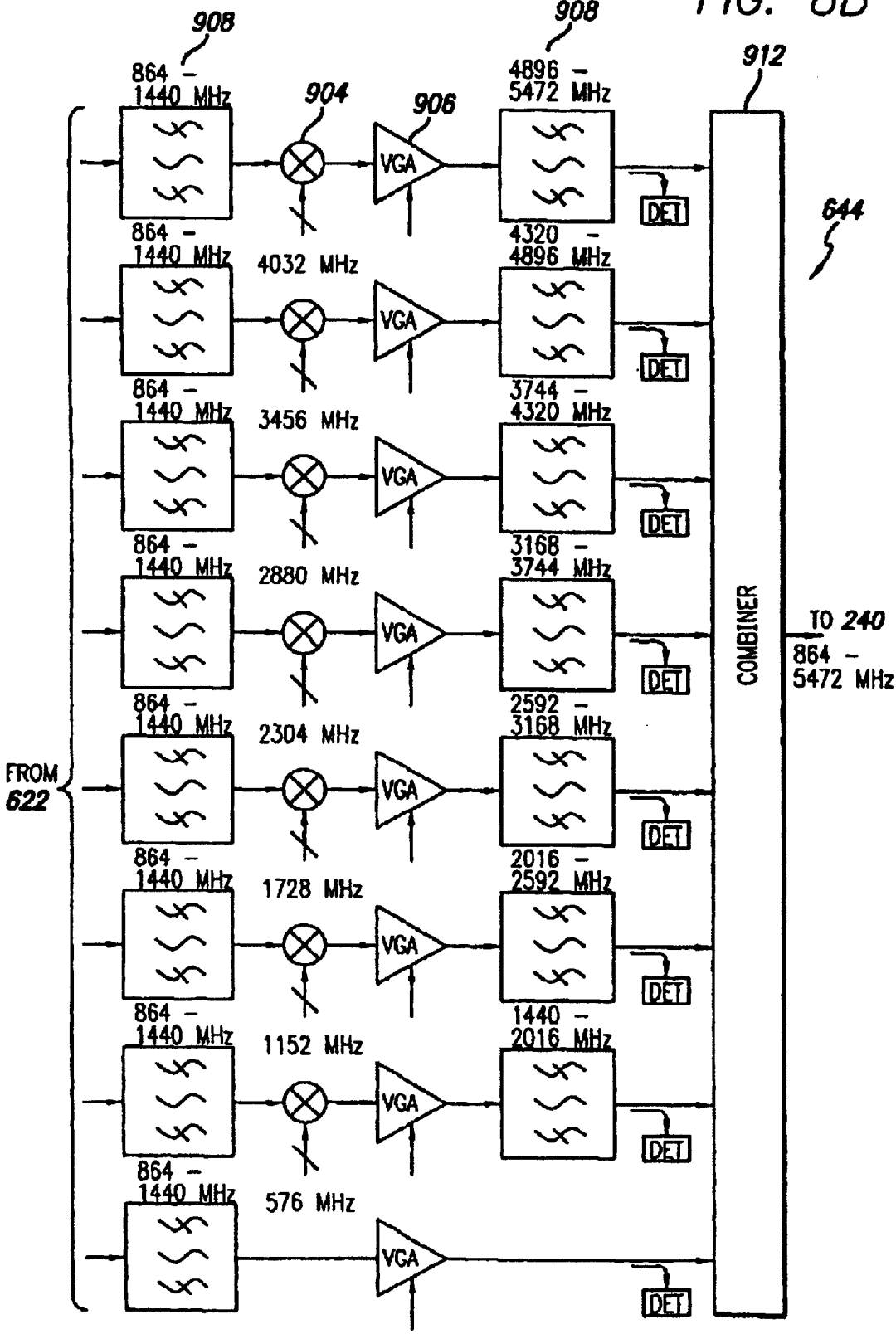
FIG. 8B is a block diagram of an embodiment of RF up-converter 644.

Referring to FIG. 8B, RF up-converter 644 is structured similar to IF up-converter 642 and performs a similar function combining the 8 RF channels received from the IF up-converter 642 just as each IF up-converter combines the 8 IF channels received by it. In more detail, RF up-converter 644 includes eight frequency shifters and a combiner 912.

Each frequency shifter includes a mixer 904, various gain blocks 906, and various filter 908 coupled in series to an input of the combiner 912.

RF up-converter 644 operate as follows. Mixer 904 mixes one of the RF channels with a carrier at a specific RF frequency (e.g., 4032 MHz for the top frequency shifter in FIG. 8B), thus frequency upshifting the RF channel to RF frequencies. Gain blocks 906 and filters 908 are used to implement standard amplitude adjustment and frequency filtering. For example, in FIG. 8B, one filter 908 bandpass filters the incoming RF channel and another bandpass filters the produced RF signal, both filters for suppressing artifacts outside the frequency range of interest. Each frequency shifter uses a different frequency (e.g., ranging in equal increments from 0 to 4032 MHz in this example) so combiner 912 simply combines the 8 incoming RF signals to produce the single electrical high-speed channel containing the information of all 8 incoming RF channels or, equivalently, all 64 IF channels received by IF up-converter 642. In this example, the electrical high-speed channel covers the frequency range of 864–5472 MHz.

RF down-converter 624 and IF down-converter 622 implement the reverse functionalities, splitting the RF signal into its 8 constituent RF channels and then splitting each RF channel into its 8 constituent IF channels, respectively, thus producing 64 IF channels (i.e., FDM channels) to be received by demodulator 620.

Referring to FIG. 8A, RF down-converter 624 includes a splitter 920 coupled to eight frequency shifters. Each frequency shifter includes a mixer 924, various gain blocks 926, and various filters 928 coupled in series. Splitter 920 splits the incoming electrical high-speed channel into eight different RF signals and each frequency shifter recovers a different constituent RF channel from the RF signal it receives. Mixer 924 mixes the received RF signal with a carrier at a specific RF frequency (e.g., 4032 MHz for the top frequency shifter in FIG. 8A), thus frequency downshifting the RF signal to its original IF range (e.g., 864–1440 MHz). Filter 928 then filters out this specific IF frequency range. Each frequency shifter uses a different RF frequency with mixer 924 and thus recovers a different RF channel. The output of RF down-converter 624 is the 8 constituent RF channels.

IF down-converter 622 of FIG. 7A operates similarly. It includes a splitter 820 and 8 frequency shifters, each including a bandpass filter 822, variable gain block 823, demodulator 824, and power monitor 826. Splitter 820 splits the incoming RF channel into eight signals, from which each frequency shifter will recover a different constituent IF channel. Filter 822 isolates the frequency band within the RF channel which contains the IF channels of interest. Demodulator 824 recovers the IF channel by mixing with the corresponding IF carrier. The resulting 64 IF channels are input to demodulator 620.

Variable gain block 823 and power monitor 826 control the power level of the resulting IF channel. In an embodiment, each IF channel is output from IF down-converter 622 at a target power in order to enhance performance of the rest of the receiver 210A. Power monitor 826 measures the actual power of the IF channel, which is used to adjust the gain applied by variable gain block 823 in order to match the actual and target power levels.

Many other implementations which achieve the same functionality as the devices in FIGS. 4–8 will be apparent. For example, referring to FIG. 8B, note that the bottom channel occupies the frequency spectrum from 864–1440 MHz and, therefore, no mixer 904 is required. As another example, note that the next to bottom channel is frequency up shifted from the 864–1440 MHz band to the 1440–2016 MHz. In an approach, this is not accomplished in a single step by mixing with a 576 MHz signal. Rather, the incoming 864–1440 MHz signal is frequency up shifted to a much higher frequency range and then frequency down shifted back to the 1440–2016 MHz range. This avoids unwanted interference from the 1440 MHz end of the original 864–1440 MHz signal. For example, referring to FIG. 7B, in an embodiment, the filters 808 are not required due to the good spectral characteristics of the signals at that point. A similar situation may apply to the other filters shown throughout, or the filtering may be achieved by different filters and/or filters placed in different locations. Similarly, amplification may be achieved by devices other than the various gain blocks shown. In an embodiment, both RF a down-converter 624 and RF up-converter 644 do not contain variable gain elements. As one final example, in FIGS. 4–8, some functionality is implemented in the digital domain while other functionality is implemented in the analog domain. This apportionment between digital and analog may be different for other implementations. Other variations will be apparent.

The FDM aspect of an embodiment 400 has been described in the context of combining 64 low-speed channels 240 into a single optical high-speed channel 120. The invention is in no way limited by this example. Different total numbers of channels, different data rates for each channel, different aggregate data rate, and formats and protocols other than the STS/OC protocol are all suitable for the current invention. In fact, one advantage of the FDM approach is that it is easier to accommodate low-speed channels which use different data rates and/or different protocols. In other words, some of the channels 240B may use data rate A and protocol X; while others may use data rate B and protocol Y. while yet others may use data rate C and protocol Z. In the FDM approach, each of these may be allocated to a different carrier frequency and they can be straightforwardly combined so long as the underlying channels are not so wide as to cause the different carriers to overlap. In contrast, in the TDM approach, each channel is allocated certain time slots and, essentially, will have to be converted to a TDM signal before being combined with the other channels.

Another advantage is lower cost. The FDM operations may be accomplished with low-cost components commonly found in RF communication systems. Additional cost savings are realized since the digital electronics such as modulator 640 and demodulator 620 operate at a relatively low data rate compared to the aggregate data rate. The digital electronics need only operate as fast as the data rate of the individual low-speed channels 240. This is in contrast to TDM systems, which require a digital clock rate that equals the aggregate transmission rate. For OC-192, which is the data rate equivalent to the high-speed channels 120 in system 100, this usually requires the use of relatively expensive gallium arsenide integrated circuits instead of silicon.

Moving further along transmitter 210B, E/O converter 240 preferably includes an optical source and an external optical modulator. Examples of optical sources include solid state lasers and semiconductor lasers. Example external optical modulators include Mach Zender modulators and electro-absorptive modulators. The optical source produces an optical carrier, which is modulated by the electrical high-speed channel as the carrier passes through the modulator. The electrical high-speed channel may be predistorted in order to increase the linearity of the overall system. Alternatively, E/O converter 240 may be an internally modulated laser. In this case, the electrical high-speed channel drives the laser, the output of which will be a modulated optical beam (i.e., the optical high-speed channel 120B).

The wavelength of the optical high-speed channel may be controlled using a number of different techniques. For example, a small portion of the optical carrier may be extracted by a fiber optic splitter, which diverts the signal to a wavelength locker. The wavelength locker generates an error signal when the wavelength of the optical carrier deviates from the desired wavelength. The error signal is used as feedback to adjust the optical source (e.g., adjusting the drive current or the temperature of a laser) in order to lock the optical carrier at the desired wavelength. Other approaches will be apparent.

The counterpart on the receiver 210A is O/E converter 220, which typically includes a detector such as an avalanche photo-diode or PIN-diode. In an alternate approach, O/E converter 220 includes a heterodyne detector. For example, the heterodyne detector may include a local oscillator laser operating at or near the wavelength of the incoming optical high-speed channel 120A. The incoming optical high-speed channel and the output of the local oscillator laser are combined and the resulting signal is detected by a photodetector. The information in the incoming optical high-speed channel can be recovered from the output of the photodetector. One advantage of heterodyne detection is that the thermal noise of the detector can be overcome and shot noise limited performance can be obtained without the use of fiber amplifiers.

The modularity of the FDM approach also makes the overall system more flexible and scaleable. For example, frequency bands may be allocated to compensate for fiber characteristics. For a 70 km fiber, there is typically a null around 7 GHz. With the FDM approach, this null may be avoided simply by not allocating any of the frequency bands around this null to any low-speed channel 240. As a variant, each of the frequency bands may be amplified or attenuated independently of the others, for example in order to compensate for the transmission characteristics of that particular frequency band.

Various design tradeoffs are inherent in the design of a specific embodiment of an FDM-based system 100 for use in a particular application. For example, the type of Reed Solomon encoding may be varied or other types of forward error correction codes (or none at all) may be used, depending on the system margin requirements. As another example, in one variation of QAM, the signal lattice is evenly spaced in complex signal space but the total number of states in the QAM constellation is a design parameter which may be varied. The optimal choices of number of states and other design parameters for modulator/demodulator 640/620 will depend on the particular application. Furthermore, the modulation may differ on some or all of the low speed channels. For example, some of the channels may use PSK modulation, others may use 16-QAM, others may use 4-QAM, while still others may use an arbitrary complex constellation. The choice of a specific FDM implementation also involves a number of design tradeoffs, such as the choices of intermediate frequencies, whether to implement components in the digital or in the analog domain, and whether to use multiple stages to achieve the multiplexing.

As a numerical example, in one embodiment, a (187,204) Reed-Solomon encoding may be used with a rate ¾ 16-QAM trellis code. The (187,204) Reed-Solomon encoding transforms 187 bytes of data into 204 bytes of encoded data and the rate ¾ 16-QAM trellis code transforms 3 bits of information into a single 16-QAM symbol. In this example, a single low-speed channel 240B, which has a base data rate of 155 Mbps would require a symbol rate of 155 Mbps×(204/187)×(1/3)=56.6 Megasymbols per second. Including an adequate guard band, a typical frequency band would be about 72 MHz to support this symbol rate. Suppose, however, that it is desired to decrease the bandwidth of each frequency band. This could be accomplished by changing the encoding and modulation. For example, a (188,205) Reed-Solomon code with a rate ⅚ 64-QAM trellis code would require a symbol rate of 155 Mbps×(205/188)×(1/5)=33.9 Megasymbols per second or 43 MHz frequency bands, assuming proportional guard bands. Alternately, if 72 MHz frequency bands were retained, then the data rate could be increased.

As another example, an optical modulator 240 with better linearity will reduce unwanted harmonics and interference, thus increasing the transmission range of system 100. However, optical modulators with better linearity are also more difficult to design and to produce. Hence, the optimal linearity will depend on the particular application. An example of a system-level tradeoff is the allocation of signal power and gain between the various components. Accordingly, many aspects of the invention have been described in the context of certain embodiments but it should be understood that the invention is not to be limited by these specific examples.

It should be noted that the embodiments described above are exemplary only and many other alternatives will be apparent. For example, in the embodiments discussed above, the low-speed channels 240 were combined into an electrical high-speed channel using solely frequency division multiplexing. For example, each of the 64 low-speed channels 240B was effectively placed on a carrier of a different frequency and these 64 carriers were then effectively combined into a single electrical high-speed channel solely on the basis of different carrier frequencies. This is not meant to imply that the invention is limited solely to frequency division multiplexing to the exclusion of all other approaches for combining signals. In fact, in alternate embodiments, other approaches may be used in conjunction with frequency division multiplexing. For example, in one approach, 64 low-speed channels 240B may be combined into a single high-speed channel 120 in two stages, only the second of which is based on frequency division multiplexing. In particular, 64 low-speed channels 240B are divided into 16 groups of 4 channels each. Within each group, the 4 channels are combined into a single signal using 16-QAM (quadrature amplitude modulation). The resulting QAM-modulated signals are frequency-division multiplexed to form the electrical high-speed channel.

As another example, it should be clear that the tributaries 160 may themselves be combinations of signals. For example, some or all of the OC-3/OC-12 tributaries 160 may be the result of combining several lower data rate signals, using either frequency division multiplexing or other techniques. In one approach, time division multiplexing may be used to combine several lower data rate signals into a single OC-3 signal, which serves as a tributary 160.

As a final example, frequency division multiplexing has been used in all of the preceding examples as the method for combining the low-speed channels 240 into a high-speed channel 120 for transmission across optical fiber 104. Other approaches could also be used. For example, the low-speed channels 240 could be combined using wavelength division multiplexing, in which the combining of channels occurs in the optical domain rather than in the electrical domain. Many of the principles described above may also be applied to the wavelength division multiplexing approach.

Although the invention has been described in considerable detail with reference to certain embodiments thereof, other embodiments are possible. Therefore, the scope of the appended claims should not be limited to the description of the embodiments contained herein.

What is claimed is:

1. A system for recovering a data stream from a return-to-zero formatted signal comprising:

a non-return-to-zero clock and data recovery unit for recovering an intermediate clock signal and an intermediate data stream comprising extra zeroes from a received return-to-zero formatted signal;

control logic coupled to the non-return-to-zero clock and data recovery unit for discarding the extra zeroes in the intermediate data stream to produce a resulting data stream representing data values of the received return-to-zero formatted signal; and a clock divider coupled to the non-return-to-zero clock and data recovery unit for frequency dividing the intermediate clock signal to maintain the data rate of the return-to-zero formatted signal.

2. A system comprising:

a non-return-to-zero clock and data recovery unit for recovering an intermediate clock signal and an intermediate data stream comprising extra zeroes from a received return-to-zero formatted signal;

a deserializer for converting the intermediate data stream received from the non-return-to-zero clock and data recovery unit to a plurality of parallel intermediate bit streams, and for converting the intermediate clock signal to a parallel clock signal corresponding to the plurality of parallel intermediate bit streams; and control logic for discarding the extra zeroes in the plurality of parallel intermediate bit streams received from the deserializer using the parallel clock signal received from the deserializer.

3. In an optical fiber communication network, an input converter comprising:

a non-return-to-zero clock and data recovery unit for recovering an intermediate clock signal and an intermediate data stream comprising extra zeroes from a received return-to-zero formatted signal;

control logic coupled to the non-return-to-zero clock and data recovery unit for discarding the extra zeroes in the intermediate data stream to produce a resulting data stream representing data values of the received return-to-zero formatted signal; and a clock divider coupled to the non-return-to-zero clock and data recovery unit for frequency dividing the intermediate clock signal to maintain the data rate of the return-to-zero formatted signal.

4. The system of claim 3 wherein the optical fiber communication system utilizes frequency division multiplexing.

5. The system of claim 4 wherein the input converter is a variable rate input converter for processing non-uniform rate signals.

6. A method for recovering a data stream from a return-to-zero formatted signal comprising:

recovering an intermediate data stream from the return-to-zero formatted signal using non-return-to-zero data recovery; and discarding every other bit representing an extra zero in the intermediate data stream to produce a resulting data stream representing data values of the received return-to-zero formatted signal.

7. The method of claim 6 further comprising:

recovering an intermediate clock signal from the return-to-zero formatted signal using non-return-to-zero clock recovery; and frequency dividing the intermediate clock signal to maintain the data rate of the return-to-zero formatted signal.

8. A method comprising:

recovering an intermediate clock signal from the return-to-zero formatted signal using non-return-to-zero clock recovery;

converting the intermediate data stream to a plurality of parallel intermediate bit streams;

converting the intermediate clock signal to a parallel clock signal corresponding to the plurality of parallel intermediate bit streams; and discarding the extra zeroes in the plurality of parallel intermediate bit streams using the parallel clock signal.

9. A system for recovering a data stream from a return-to-zero formatted signal comprising:

means for recovering an intermediate data stream from the return-to-zero formatted signal using non-return-to-zero data recovery; and means for discarding every other bit representing an extra zero in the intermediate data stream to produce a resulting data stream representing data values of the received return-to-zero formatted signal.

10. The system of claim 9 further comprising:

means for recovering an intermediate clock signal from the return-to-zero formatted signal using non-return-to-zero clock recovery; and means for frequency dividing the intermediate clock signal to maintain the data rate of the return-to-zero formatted signal.

11. A system comprising:

means for recovering an intermediate clock signal from the return-to-zero formatted signal using non-return-to-zero clock recovery;

means for converting the intermediate data stream to a plurality of parallel intermediate bit streams;

means for converting the intermediate clock signal to a parallel clock signal corresponding to the plurality of parallel intermediate bit streams; and means for discarding the extra zeroes in the plurality of parallel intermediate bit streams using the parallel clock signal.

*12. A system for recovering a data stream from a return-to-zero formatted signal comprising:*

*a non-return-to-zero clock and data recovery unit for recovering an intermediate clock signal and an intermediate data stream comprising extra zeroes from a received return-to-zero formatted signal; and*

*control logic coupled to the non-return-to-zero clock and data recovery unit for discarding the extra zeroes in the intermediate data stream to produce a resulting data stream representing data values of the received return-to-zero formatted signal.*

*13. The system of claim 12 wherein the system utilizes frequency division multiplexing.*

*14. The system of claim 13, further comprising a variable rate input converter for processing non-uniform rate signals.*

*15. A system for encoding a non-return-to-zero data stream clocked by a clock signal as a return-to-zero formatted signal comprising:*

*control logic for inserting zeros after every bit of the data stream to generate an intermediate data stream;*

*a frequency multiplier for frequency doubling the clock signal to generate an intermediate clock signal; and*

*output circuitry for encoding the intermediate data stream as a non-return-to-zero formatted signal clocked by the intermediate clock signal.*

*16. The system of claim 15 wherein the output circuitry comprises a serializer.*

*17. The system of claim 15, further comprising:*

*a non-return-to-zero clock and data recovery unit for recovering an intermediate clock signal and an intermediate data stream comprising extra zeroes from the return-to-zero formatted signal; and*

*control logic coupled to the non-return-to-zero clock and data recovery unit for discarding the extra zeroes in the intermediate data stream to produce a resulting data stream representing data values of the received return-to-zero formatted signal.*

*18. A method for encoding a non-return-to-zero data stream clocked by a clock signal as a return-to-zero formatted signal comprising:*

*inserting zeroes after every bit of the data stream to generate an intermediate data stream;*

*frequency doubling the clock signal to generate an intermediate clock signal; and*

*encoding the intermediate data stream as a non-return-to-zero formatted signal clocked by the intermediate clock signal.*

*19. The method of claim 18, further comprising:*

*recovering an intermediate data stream from the return-to-zero formatted signal using non-return-to-zero data recovery; and*

*discarding every other bit representing an extra zero in the intermediate data stream to produce a resulting data stream representing data values of the received return-to-zero formatted signal.*

*20. A system for encoding a non-return-to-zero data stream clocked by a clock signal as a return-to-zero formatted signal comprising:*

*control logic for inserting zeros before every bit of the data stream to generate an intermediate data stream;*

*a frequency multiplier for frequency doubling the clock signal to generate an intermediate clock signal; and*

*output circuitry for encoding the intermediate data stream as a non-return-to-zero formatted signal clocked by the intermediate clock signal.*

*21. The system of claim 20, further comprising:*

*a non-return-to-zero clock and data recovery unit for recovering an intermediate clock signal and an intermediate data stream comprising extra zeroes from the return-to-zero formatted signal; and*

*control logic coupled to the non-return-to-zero clock and data recovery unit for discarding the extra zeroes in the intermediate data stream to produce a resulting data stream representing data values of the received return-to-zero formatted signal.*

*22. A method for encoding a non-return-to-zero data stream clocked by a clock signal as a return-to-zero formatted signal comprising:*

*inserting zeroes before every bit of the data stream to generate an intermediate data stream;*

*frequency doubling the clock signal to generate an intermediate clock signal; and*

*encoding the intermediate data stream as a non-return-to-zero formatted signal clocked by the intermediate clock signal.*

*23. The method of claim 22, further comprising:*

*recovering an intermediate data stream from the return-to-zero formatted signal using non-return-to-zero data recovery; and*

*discarding every other bit representing an extra zero in the intermediate data stream to produce a resulting data stream representing data values of the received return-to-zero formatted signal.*

* * * * *